(12) United States Patent
Seo et al.

(10) Patent No.: US 7,757,402 B2
(45) Date of Patent: Jul. 20, 2010

(54) METHOD FOR ASSEMBLING ROLLING BEARING DEVICE

(75) Inventors: Nobuyuki Seo, Nara (JP); Masao Takimoto, Kashiwara (JP)

(73) Assignee: JTEKT Corporation, Osaka (JP)

( * ) Notice: Subject to any disclaimer, the term of this patent is extended or adjusted under 35 U.S.C. 154(b) by 1154 days.

(21) Appl. No.: 10/544,676

(22) PCT Filed: Feb. 5, 2004

(86) PCT No.: PCT/JP2004/001188

§ 371 (c)(1),
(2), (4) Date: Feb. 10, 2006

(87) PCT Pub. No.: WO2004/070223

PCT Pub. Date: Aug. 19, 2004

(65) Prior Publication Data

US 2006/0137186 A1 Jun. 29, 2006

(30) Foreign Application Priority Data

Feb. 7, 2003 (JP) ............................... 2003-031501
Sep. 26, 2003 (JP) ............................... 2003-335059

(51) Int. Cl.
*B21K 1/76* (2006.01)
(52) U.S. Cl. ............................... 29/898.07; 29/898.062; 29/898.064; 301/105.1; 384/589
(58) Field of Classification Search ............ 29/898.062, 29/898.064, 898.07; 301/105.1; 384/589
See application file for complete search history.

(56) References Cited

U.S. PATENT DOCUMENTS 5,059,040 A 10/1991 Kadokawa
5,159,754 A * 11/1992 Vancsik ................... 29/898.07
5,875,550 A * 3/1999 Kohn ...................... 29/898.07
6,149,244 A * 11/2000 Wagner ................... 301/105.1
6,644,861 B2 * 11/2003 Hacker et al. ............... 384/589

FOREIGN PATENT DOCUMENTS

DE 199 48 423 A1 4/2001

(Continued)

OTHER PUBLICATIONS

Microfilm of the specification and drawings annexed to the request of Japanese Utility Model Application No. 100386/1990 (Laid-open No. 56921/1992), May 15, 1992.

(Continued)

*Primary Examiner*—Rick K Chang
(74) *Attorney, Agent, or Firm*—Birch, Stewart, Kolasch & Birch, LLP

(57) ABSTRACT

In an assembling method for roller bearing assembly according to the invention, a cage 25 featuring high general-purpose versatility is used whereas a retainer ring 40 for preventing the drop-off of first-row tapered rollers 18*a* is fitted in a sub-assemble member 20 at place diametrically inwardly with respect to the first-row tapered rollers 18*a*. Subsequently, a hub body 16 is combined with an outer ring 13 having the first seal ring 15 and the sub-assemble member 20 mounted thereto, as pushing out the retainer ring 40 by means of a step portion defined between a smaller-diameter cylindrical surface portion 30 and a first inner raceway 28 of the hub body 16.

1 Claim, 23 Drawing Sheets

FOREIGN PATENT DOCUMENTS

| | | |
|---|---|---|
| EP | 0 667 530 A2 | 8/1995 |
| EP | 0 980 985 A2 | 2/2000 |
| JP | 3-92621 A | 4/1991 |
| JP | 4-56921 U | 5/1992 |
| JP | 10-61673 A | 3/1998 |
| JP | 10-196665 | 7/1998 |
| JP | 2000-65049 A | 3/2000 |
| JP | 2002-283805 A | 10/2002 |
| JP | 2003-113839 A | 4/2003 |
| JP | 2003-113841 A | 4/2003 |
| WO | WO-02/073051 A2 | 9/2002 |
| WO | WO-02/073051 A3 | 9/2002 |

OTHER PUBLICATIONS

CD-ROM of the specification and drawings annexed to the request of Japanese Utility Model Application No. 68512/1991 (Laid-open No. 14643/1993), Feb. 26, 1993.

* cited by examiner

METHOD FOR ASSEMBLING ROLLING BEARING DEVICE

TECHNICAL FIELD

The present invention relates to an assembling method for double-row tapered-roller bearing assembly.

BACKGROUND ART

A double-row tapered-roller bearing assembly has been used as a bearing for an automotive wheel and the like. FIG. 10 is a sectional view of the double-row tapered-roller bearing assembly conventionally used widely in the art (Conventional Example 1). The conventional example 1 includes: a single outer ring 1 having two outer raceways 2, 2; a pair of inner rings 4, 4 having inner raceways 3, 3; and plural tapered rollers 5, 5 rollably interposed between the outer raceways and the inner raceways. The conically recessed outer raceways 2, 2 are formed on an inner peripheral surface of the outer ring 1. These outer raceways 2, 2 are disposed in opposed relation so that an inside diameter of the outer ring 1 is progressively decreased from either end thereof toward the center thereof. The inner rings 4, 4 are individually formed with the conically protruded inner raceways 3, 3 in correspondence to the respective outer raceways 2, 2. The tapered rollers 5, 5 are clamped between the inner rings 4, 4 and the outer ring 1 as interposed between the inner raceways 3, 3 and the outer raceways 2, 2 and are arranged as regularly spaced by means of a cage 6. Seal rings 7, 7 are disposed between the opposite ends of the inner peripheral surface of the outer ring 1 and a respective end of outer peripheral surfaces of the inner rings 4, 4. The seal rings 7, 7 are disposed for the purposes of hermetically sealing space between the outer ring 1 and the inner rings 4, 4 thereby preventing the invasion of external foreign substances (dusts, water, metal powder and the like) and the leakage of lubricant.

The aforementioned double-row tapered-roller bearing assembly of the conventional example 1 is assembled as follows. First, as shown in FIG. 11, sub-assemble members 11 each combining the cage 6 with the tapered rollers 5 are assembled to the inner ring 4. The resultant inner ring is inserted into the inner periphery of the outer ring 1 so as to mate the tapered rollers 5 with the outer raceways 2, 2 and the inner raceways 3,3, as shown in FIG. 12. Finally, the seal rings 7, 7 are fitted in the respective spaces between the opposite ends of the inner peripheral surface of the outer ring 1 and the respective ends of the outer peripheral surfaces of the inner rings 4, 4.

As shown in FIG. 13, the cage 6 substantially defines a truncated conical surface including: a greater ring 6a and a smaller ring 6b as a pair of ring members in spaced relation; a plurality of ridges 6c bridged between these ring members; and an annular rib 6d extended diametrically inwardly from an diametrical inside end of the smaller ring 6b. In such a construction, a trapezoidal window pocket 10 for accommodating the tapered roller 5 is defined between a respective pair of adjoining ridges 6c such that the plural trapezoidal pockets are arranged with equal spacing. FIG. 14 is a sectional view showing the sub-assemble member 11 with the tapered rollers 5 accommodated in the pockets 10. The tapered rollers 5 are disposed in a manner to sink into the respective pockets 10 from a diametrical inner side of the cage 6. FIG. 15 is a sectional view of the ridges 6c of the cage 6 taken on the plane perpendicular to a longitudinal direction of the ridges. The tapered rollers 5, disposed as described above, are depicted with the phantom lines. A circumferential width W10 of the pocket or the space between each pair of adjoining ridges 6c is smaller than a diameter of the tapered roller 5 as determined at each place on a generatrix of the tapered rollers 5. Hence, the tapered rollers 5 are held in posture as sunk into the respective pockets of the cage 6. In the sub-assemble member 11, the cage 6 merely supports the tapered rollers 5 on diametrical outer sides thereof. Hence, the tapered rollers 5 never drop from the sub-assemble member 11 diametrically outwardly thereof. Depending upon some posture of the sub-assemble member 11, however, the tapered roller 5 may incline diametrically inwardly to drop off from the sub-assemble member 11. A cage having the structure detrimentally allowing the disposed tapered rollers to drop diametrically inwardly, as exemplified by this cage 6, has high general-purpose versatility but also has a drawback that the tapered rollers are apt to drop off.

Since the conventional example 1 adopts the aforementioned assembling method as shown in FIG. 11 and FIG. 12, the drop-off of the tapered rollers 5 is not encountered during the assembling steps. This is because the sub-assemble member 11 can be handled in a state where the sub-assemble member 11 is assembled with the inner ring 4, as shown in FIG. 11. That is, the tapered rollers 5 in the state of FIG. 11 are clamped between the inner ring 4 and the cage 6 so that the tapered rollers are retained as prevented from dropping off.

More recently, a hub unit having a so-called third generation structure has been proposed aiming at reducing costs by reducing the number of components. FIG. 16 illustrates an example of a conventionally known structure of the hub unit (Conventional Example 2). Unlike the conventional example 1, this hub unit is constructed such that one end of a hub body 16 is formed with a flange 26 for supporting a road wheel, that an outer peripheral surface of an intermediate portion of the hub body 16 is formed with a first inner raceway 28 constituting a first-row tapered-roller bearing, and that the other end of the hub body 16 is adapted to allow an inner ring 35 having a second inner raceway 36 to be fitted on an outer periphery thereof. Such a structure cannot adopt the assembling step as suggested by the conventional example 1, wherein a sub-assemble member 19, combined with the hub body 16 defining the inner ring, is inserted into an outer ring 13. In the case of the conventional example 2 shown in FIG. 16, the flange 26 formed at the one end of the hub body 16 interferes, thus disabling the mounting of a first seal ring 15 to place near the flange after insertion of the hub body 16 into the outer ring 13. Hence, the following steps are taken in this case. First, the sub-assemble member 19 having first-row tapered rollers 18a disposed in a first cage 17 is placed on a first outer raceway 22 of the outer ring 13. Next, the first seal ring 15 is mounted to place. Subsequently, the hub body 16 is inserted into the outer ring 13. In the case of the structure of the conventional example 2, it is impossible to handle the sub-assemble member 19 in a state where the sub-assemble member is assembled with the hub body 16 defining the inner ring.

When the hub body 16 is inserted into the outer ring 13 according to the conventional example 2, either one of the following methods is taken. (1) The outer ring 13 with the sub-assemble member 19 and the first seal ring 15 mounted thereto is postureed to direct a rotary axis of the bearing horizontally and then, the outer ring 13 is combined with the hub body. (2) The outer ring 13 with the sub-assemble member 19 and the first seal ring 15 mounted thereto is postureed such that the rotary axis of the bearing is directed vertically while a second outer raceway 23 is postureed above the first outer raceway 22 and then, the outer ring 13 is combined with the hub body 16. The reason for taking the method (1) or (2) is because it is more efficient to move the lighter component when combining these components. Another reason for taking the method (2) is as follows. In the subsequent step, the inner ring 35 is press-fitted on the hub body 16. In order to receive an axial force associated with the press-fit, the hub body 16 is placed on a jig as upstanding on its side formed with the flange 26. According to the method (2), the hub body may be subjected to this step in an as-is state, so that the operation efficiency is increased. Unfortunately, the methods (1) and (2) cannot obviate the drop-off of the first-row tapered rollers 18a.

In order to overcome this problem, the conventional example 2 devices the structure of the first cage 17 which is designed as an anti-drop cage. In a state where the first-row tapered rollers 18a and the first cage 17 are combined into the sub-assemble member 19, the tapered rollers 18a are retained by the first cage 17 so as to be prevented from dropping diametrically inwardly. FIG. 9 is a sectional view showing ridges 17c of the first cage 17 of the conventional example 2. In the figure, the tapered rollers 18a so retained are depicted with the phantom lines. Referring to FIG. 9, the width W17 of a pocket in section, as viewed from the diametrical inner side of the first cage 17, is smaller than a diameter D18a of the tapered roller 18a in section. Thus, the tapered roller 18a is so retained as not to drop diametrically inwardly (see, for example, Japanese Unexamined Patent Publication No. 2000-65049).

DISCLOSURE OF THE INVENTION

Unfortunately, the anti-drop cage as illustrated by the first cage 17 of the aforementioned conventional example 2 does not have the general-purpose versatility and hence, an enormous cost is required for fabricating the cage. On the other hand, the cage of the structure allowing the rollers to drop diametrically inwardly, as exemplified by the cage 6 of the conventional example 1, has the general-purpose versatility so as to be fabricated on a mass-production basis. Hence, the cage has an advantage of low fabrication cost. However, the cage cannot obviate the aforementioned problem associated with the drop-off of the tapered rollers. The problem may be encountered during the steps prior to the insertion of the hub body into the outer ring.

It is therefore an object of the invention to provide an assembling method wherein the double-row tapered-roller bearing assembly comprising the hub body formed with the flange may be assembled without using the costly cage having the poor general-purpose versatility, but by using only the cage having the high general-purpose versatility to increase the degree of freedom of postureing the members during the assembly work.

Such a problem is solved by the invention described as below. According to the invention, an assembling method for a double-row tapered-roller bearing assembly comprising: an outer ring including a first outer raceway and a second outer raceway formed on an inner peripheral surface thereof; an inner ring including a second inner raceway in opposing relation with the second outer raceway; a hub body including a first inner raceway in opposing relation with the first outer raceway, formed with a flange projecting diametrically outwardly from one end thereof, and formed with a smaller-diameter cylindrical surface portion at the other end thereof, the smaller-diameter cylindrical surface portion allowing the inner ring to be fixedly fitted thereon; a plurality of first-row tapered rollers interposed between the first inner raceway and the first outer raceway; a first cage allowing the first-row tapered rollers to be arranged thereon at regular space intervals; and a first seal ring mounted to the outer ring at its end close to the first outer raceway, the method comprising the steps of: fabricating a sub-assemble member by combining the first cage with the first-row tapered rollers; fitting a retainer ring in the sub-assemble member at place diametrically inwardly with respect to the first-row tapered rollers, thereby pressingly supporting the tapered rollers; mounting the sub-assemble member to the first outer raceway of the outer ring; mounting the first seal ring to the outer ring with the sub-assemble member mounted thereto at an end of the inner peripheral surface formed with the first outer raceway; and combining the hub body with the outer ring having the first seal ring and the sub-assemble member mounted thereto, as pushing out the retainer ring fitted in the sub-assemble member by means of a step portion defined between the smaller-diameter cylindrical surface portion and the first inner raceway of the hub body. According to such an assembling method, the drop-off of the tapered rollers is prevented by the retainer ring, so that the double-row tapered-roller bearing assembly including the hub body formed with the flange can be fabricated using the cage having the general-purpose versatility. In addition, the retainer ring is pushed out by the step portion of the hub body, thus negating the need for a step of removing the retainer ring.

According to another aspect of the invention, an assembling method for the double-row tapered-roller bearing assembly, using a retainer comprising a cylindrical main body; a hub-body distal-end abutment portion extended radially inwardly from one axial end of the main body; and roller abutment portions comprising a plurality of tongues extended from the other axial end of the main body as skewed radially outwardly and arranged at regular space intervals so as to abut against the respective first-row tapered rollers in a state where the retainer is fitted in the sub-assemble member, the method comprising the steps of: fabricating a sub-assemble member by combining the first cage with the first-row tapered rollers; fitting the retainer in the sub-assemble member at place diametrically inwardly with respect to the first-row tapered rollers, thereby supporting the tapered rollers; mounting the sub-assemble member to the first outer raceway of the outer ring; mounting the first seal ring to the outer ring with the sub-assemble member mounted thereto at an end of the inner peripheral surface formed with the first outer raceway; and combining the hub body with the outer ring having the first seal ring and the sub-assemble member mounted thereto, as pushing out the hub-body distal-end abutment portion of the retainer fitted in the sub-assemble member by means of an axial distal end of the hub body.

According to such an assembling method, the drop-off of the tapered rollers is prevented by the retainer. Furthermore, the roller abutment portions of the retainer are extended as skewed radially outwardly so as to be able to support the first-row tapered rollers more stably as conforming to the tapered rollers rested aslant. Likewise to the former aspect of the invention, the bearing assembly can be fabricated using the cage having the general-purpose versatility. In addition, the retainer is pushed out by the axial distal end of the hub body, thus negating the need for the step of removing the retainer.

In a preferred mode of the invention according to a dependent claim of the application, the assembling method is characterized in that the retainer is provided with as many roller abutment portions as the first-row tapered rollers, the roller abutment portion having a concaved abutment face against the tapered roller, and that each of the roller abutment portions supports each of the first-row tapered rollers. In this case, the respective first-row tapered rollers are in abutment relation with the respective roller abutment portions and hence, the roller abutment portions are assuredly abutted against the all tapered rollers. Since the abutment faces are concaved, the tapered rollers may be supported more stably.

In another preferred mode of the invention according to a dependent claim of the application, the assembling method is characterized in that the retainer is provided with as many roller abutment portions as the first-row tapered rollers, the roller abutment portion having a convexed face against the tapered roller, and that each of the first-row tapered rollers is placed between a respective pair of adjoining roller abutment portions whereby a respective pair of adjoining roller abutment portions support each of the first-row tapered rollers. In this case, each of the first-row tapered rollers is placed between a respective pair of adjoining roller abutment portions whereby each of the tapered rollers is in abutment against each pair of adjoining roller abutment portions. It is thus ensured that the individual tapered rollers are assuredly supported. Since the abutment faces of the roller abutment portions are convexed, each of the first-row tapered rollers 18a is sunk into space between a respective pair of adjoining roller abutment portions 93 so as to be supported in a more stable manner.

According to the invention as described above, the double-row tapered-roller bearing assembly including the hub body formed with the flange can be fabricated without using the costly cage having poor general-purpose versatility but by using only the cage having the high general-purpose versatility to increase the degree of freedom of postureing the members during the assembly work.

BEST MODES FOR CARRYING OUT THE INVENTION

Figure 1:
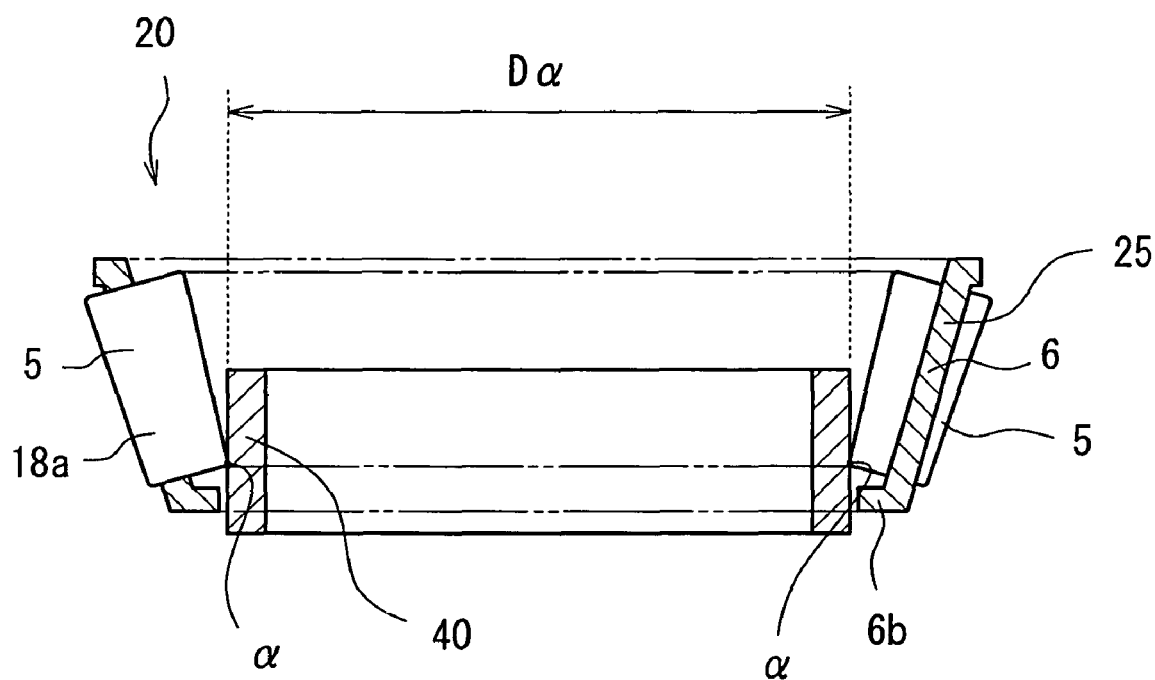
FIG. 1 is a sectional view showing a retainer ring 40 mounted to a sub-assemble member 20 according to one embodiment of the invention.

A first embodiment of the invention will hereinbelow be described with reference to the accompanying drawings. A structure of a bearing assembly according to the invention is the same per se as that of the conventional example 2, except for a structure of the first cage 17. Accordingly, description on components of the embodiment which are common to the conventional example 2 described above is dispensed with. Furthermore, those components represented by the same reference characters in the conventional example 2 are constructed the same way as in the conventional example 2.

Figure 6:
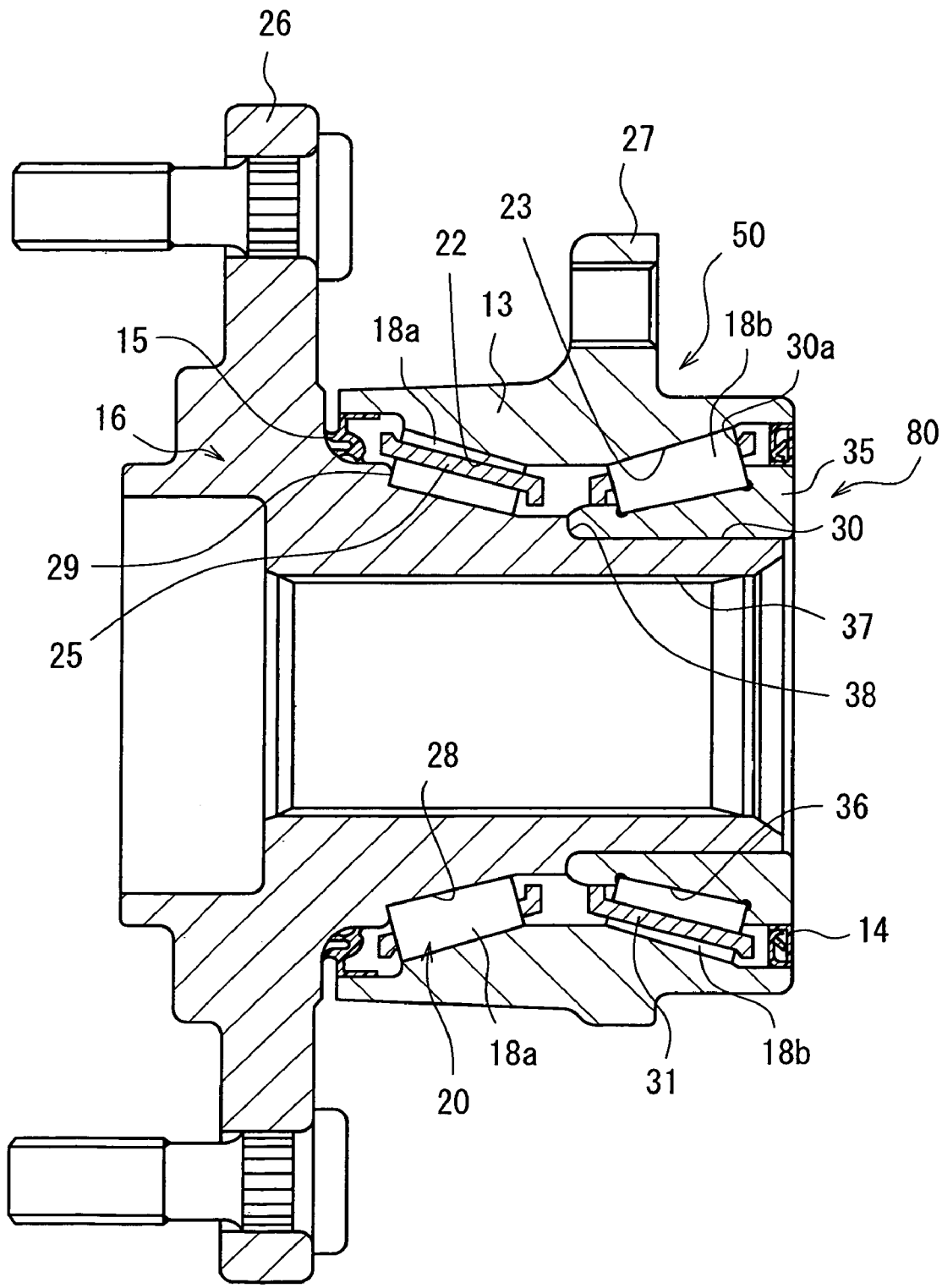
FIG. 6 is a sectional view showing a double-row tapered-roller bearing assembly fabricated according to the one embodiment of the invention.
Figure 13:
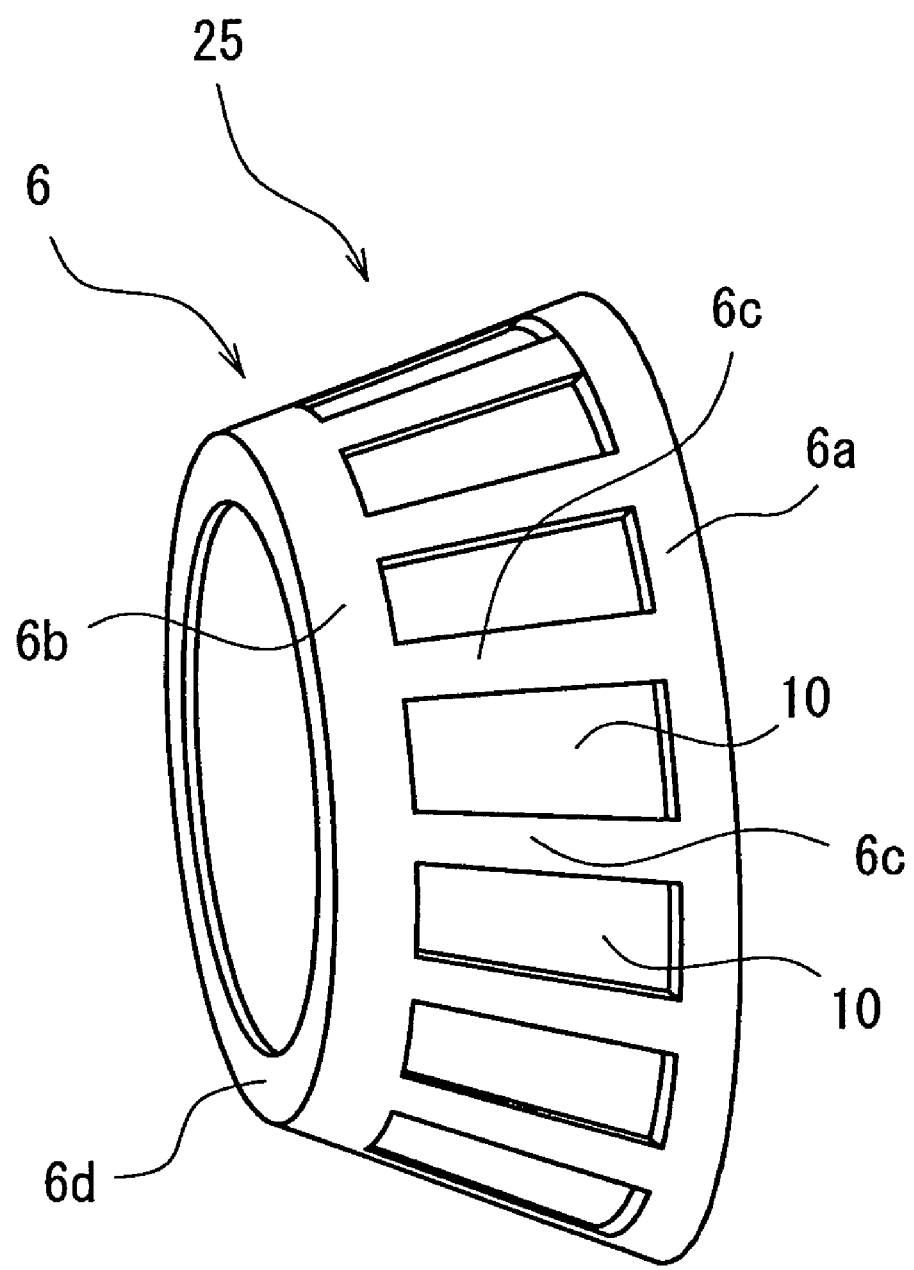
FIG. 13 is a perspective view showing a cage according to the one embodiment of the invention and to the conventional example 1.
Figure 14:
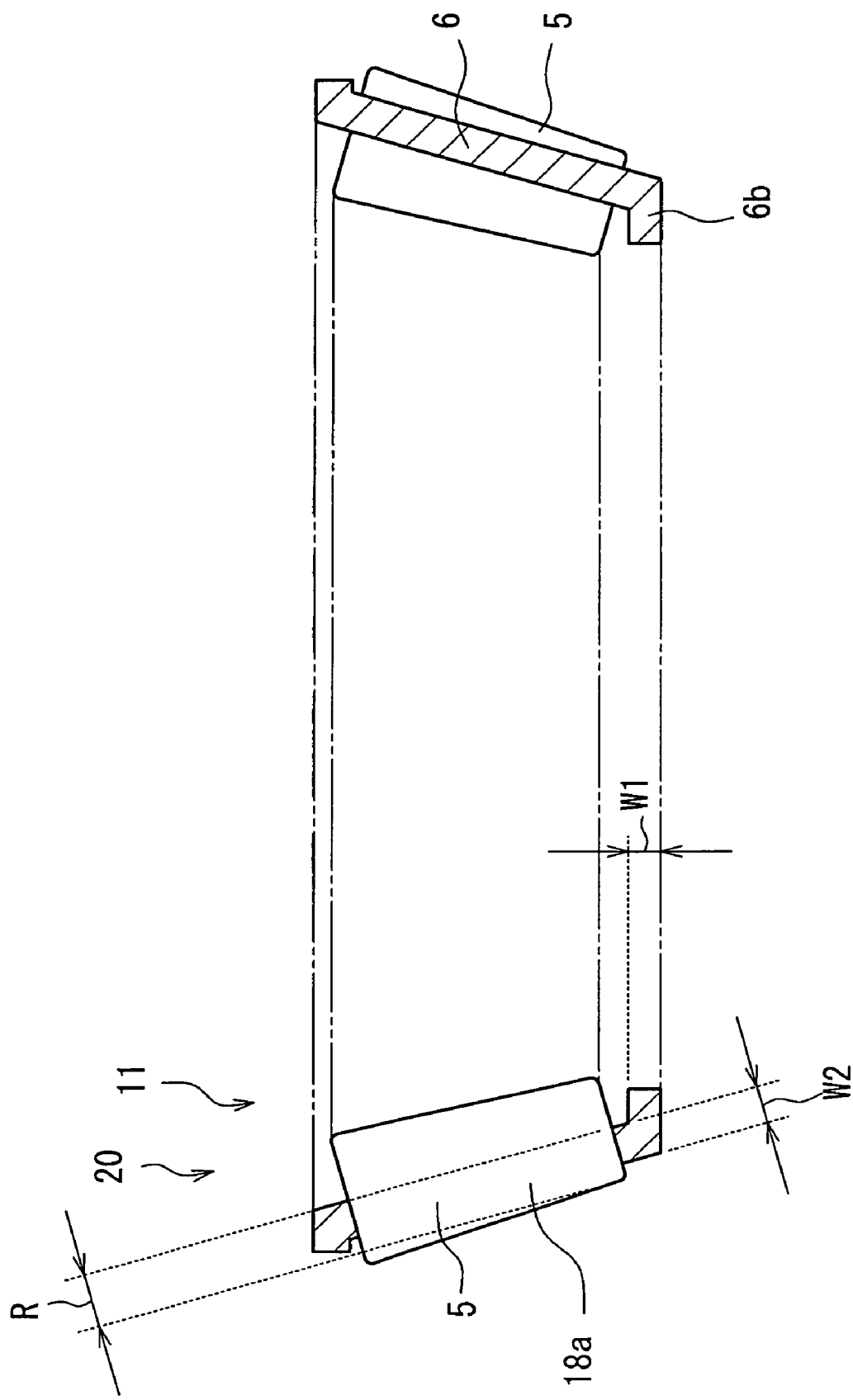
FIG. 14 is a sectional view showing a sub-assemble member according to the one embodiment of the invention and to the conventional example 1.
Figure 15:
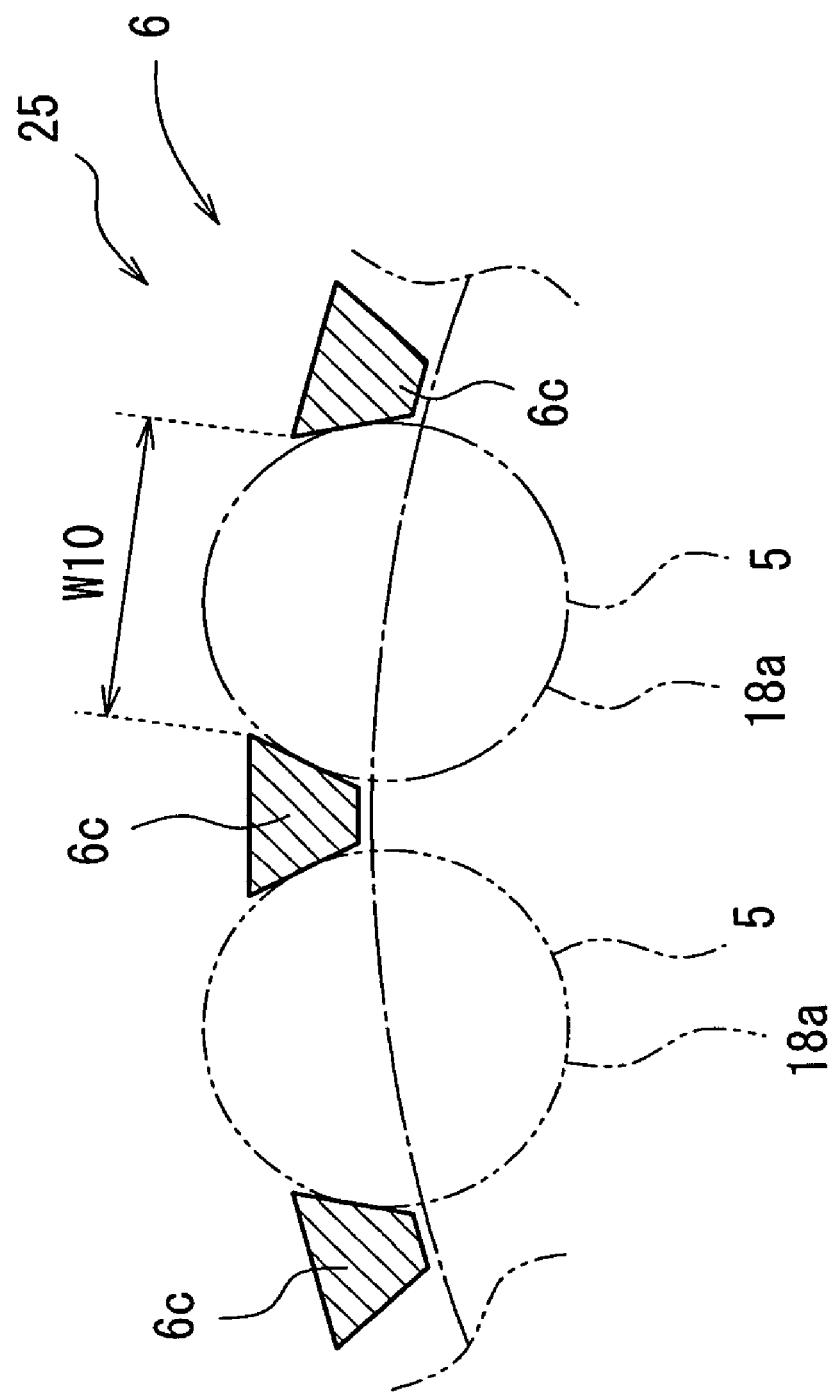
FIG. 15 is a sectional view showing ridges 6c of the cage according to the one embodiment of the invention and to the conventional example 1, the view taken on the plane orthogonal to the longitudinal direction of the ridges.
Figure 16:
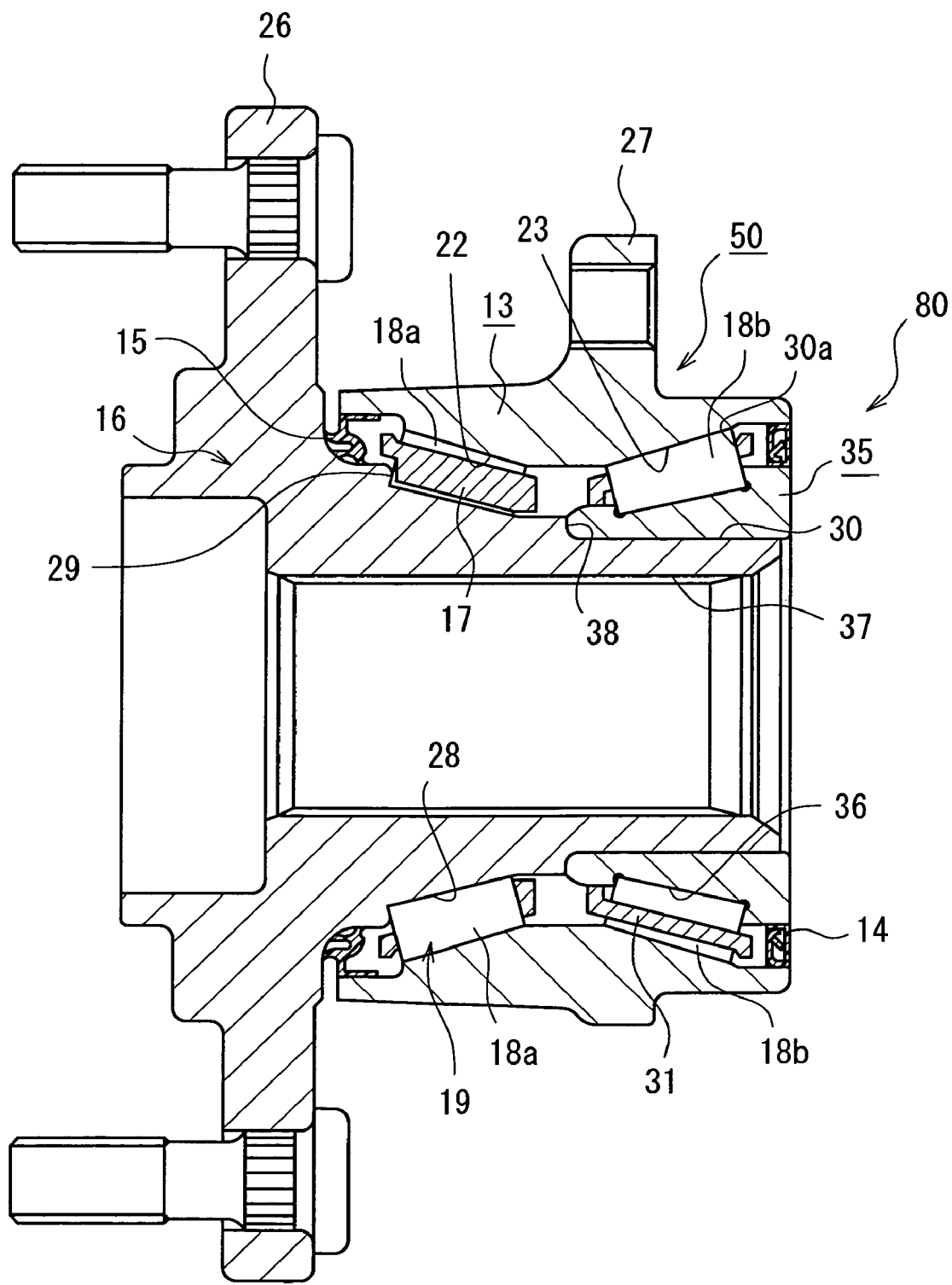
FIG. 16 is a sectional view showing a roller bearing assembly according to the conventional example 2.

FIG. 6 is a sectional view of an exemplary roller bearing assembly fabricated by applying the invention. The roller bearing assembly illustrates an automotive hub unit 50 for supporting a drive road wheel. A difference between FIG. 6 and FIG. 16 showing the conventional example 2 only consists in a first cage 25. The first cage 25 is similar to the cage 6 of the conventional example 1 shown in FIG. 13 and has high general-purpose versatility. As shown in FIG. 13, the first cage 25 defines the truncated conical surface including: the greater ring 6a defining the greater diameter of a pair of ring members in spaced relation; the smaller ring 6b defining the smaller diameter; a plurality of ridges 6c bridged between these ring members; and the annular rib 6d extended diametrically inwardly from the diametrical inside end of the smaller ring 6b. Such a structure defines a plurality of trapezoidal window pockets 10 between respective pairs of adjoining ridges 6c, the pockets accommodating the tapered rollers 5 respectively and arranged with equal spacing. FIG. 14 is a sectional view showing the sub-assemble member 20 wherein the first-row tapered rollers 18a are placed in the pockets 10. The first-row tapered rollers 18a are disposed in a manner to sink into the respective pockets 10 from the diametrical inner side of the first cage 25. FIG. 15 is a sectional view showing the ridges 6c of the first cage 25 as taken on the plane orthogonal to the longitudinal direction thereof. The figure depicts the first-row tapered rollers 18a so disposed with the phantom lines. The space between adjoining ridges 6c or the circumferential width of the pocket is smaller than the diameter of each tapered roller 18a as determined at each place on the generatrix of the first-row tapered rollers 18a. Hence, the tapered rollers 18a are held in posture as sunk into the respective pockets of the first cage 25. In the sub-assemble member 20, the cage 6 merely supports the tapered rollers 5 on diametrical outer sides thereof. Hence, the first-row tapered rollers 18a never drop from the sub-assemble member 20 diametrically outwardly thereof. Depending upon some posture of the sub-assemble member 20, however, the first-row tapered roller 18a may incline diametrically inwardly of the sub-assemble member so as to drop off therefrom. In this respect, the embodiment differs from the sub-assemble member 19 of the conventional example 2, which is adapted to prevent the tapered rollers from dropping diametrically inwardly.

The details of each component of the roller bearing assembly of the embodiment are as follows. As shown in FIG. 6, the outer ring 13 includes the first outer raceway 22 and the second raceway 23 on the inner peripheral surface thereof, which are each defined by a conically recessed surface. The first outer raceway 22 and the second outer raceway 23 are disposed in the opposite directions and in a manner to present the smaller diameter sides of the conically recessed surfaces thereof in end-to-end relation. As a result, the first outer raceway 22 and the second outer raceway 23 are inclined in the opposite directions relative to each other. Furthermore, these outer raceways are so inclined as to progressively increase the inside diameter of the outer ring 13 from the center thereof toward the respective ends thereof. The outer ring 13 is further formed with a fixture portion 27 for fixing the outer ring 13 to a suspension device (not shown), the fixture portion projecting outwardly from an intermediate portion of an outer peripheral surface of the ring. The hub body 16 includes the flange 26 projecting diametrically outwardly from one end thereof. The flange 26 serves to support the road wheel. The hub body 16 is formed with the first inner raceway 28 at an intermediate portion thereof, the inner raceway defined by a conically protruded surface. The first inner raceway 28 is so inclined as to progressively decrease the diameter of the hub body 16 from one end (the side formed with the flange 26) toward the other end thereof.

A step-like greater jaw 29 is formed at an edge of the inner raceway 28 (on the one-end-side of the hub body) such as to decrease the diameter of the hub body 16 at the corresponding portion of the inner raceway 28, whereas the other edge of the inner raceway 28 (on the other-end-side of the hub body) is free from a step-like smaller jaw for decreasing the diameter of the hub body 16 at the corresponding portion of the inner raceway 28. Further, the hub body 16 includes a smaller-diameter cylindrical surface portion 30 at the other end thereof (the end opposite to the end where the flange 26 is formed). The smaller-diameter cylindrical surface portion 30 has a smaller diameter than the first inner raceway 28 and defines a cylindrical surface concentric with the hub body 16. The smaller-diameter cylindrical surface portion 30 defines a cylindrical surface extended from a smaller-diameter cylindrical step 38 to the other edge of the hub body 16, the cylindrical step defining a start point on one-end-side of the smaller-diameter cylindrical surface portion (on the flange-26 side of the hub body 16). The hub body 16 is centrally formed with a spline hole 37 for spline engagement with an end of an automotive drive shaft (not shown).

The inner ring 35 is fixed to the hub body 16 as fitted on an outer periphery of the smaller-diameter cylindrical surface portion 30 formed at the other end of the hub body 16. An outer periphery of the inner ring 35 is formed with the second inner raceway 36 inclined in a direction to oppose the second outer raceway 23. The inner ring 35 is fixedly fitted on the smaller-diameter cylindrical surface portion 30. One end of the inner ring (on the flange-26 side of the hub body 16) is abutted against the smaller-diameter cylindrical step 38 which is the step on the one-end side (on the flange-26 side of the hub body 16) of the smaller-diameter cylindrical surface portion 30 of the hub body 16 and defines the start point on the one-end side of the smaller-diameter cylindrical surface portion 30.

The first inner raceway 28 and the first outer raceway 22 oppose each other, while a plurality of first-row tapered rollers 18a are interposed between these raceways. These first-row tapered rollers 18a are arranged with equal spacing by means of the first cage 25. As mentioned supra, the first cage 25 has the same structure as the cage 6 of the conventional example 1. The second inner raceway 36 and the second outer raceway 23 oppose each other as well, while a plurality of second-row tapered rollers 18b are interposed between these raceways. These second-row tapered rollers 18b are arranged with equal spacing by means of a second cage 31. The second cage 31 is identical with the first cage 25, thus having the same structure as the cage 6 of the conventional example 1.

The opposite ends of the inner circumferential surface of the outer ring 13 are provided with the first seal ring 15 and a second seal ring 14, respectively. The first seal ring 15 is disposed on the inner peripheral surface of the outer ring 13 at its end close to the first outer raceway 22, so as to seal a space between the inner peripheral surface of the outer ring 13 at its end close to the first outer raceway 22 and the outer peripheral surface of the hub body 16 at place opposite the above end. On the other hand, the second seal ring 14 is disposed on the inner peripheral surface of the outer ring 13 at its end close to the second outer raceway 23, so as to seal a space between the inner peripheral surface of the outer ring 13 at its end close to the second outer raceway 23 and the outer peripheral surface of the inner ring 35 at place opposite the above end.

The following steps may be taken to assemble the roller bearing assembly having the structure of FIG. 6. In a first step, the sub-assemble member 20 combining the first cage 25 with the first-row tapered rollers 18a is fabricated. The sub-assemble member 20 is of the same structure as the sub-assemble member 11 of the conventional example 1 shown in FIG. 14.

The subsequent step is performed for fitting a retainer ring 40 in the sub-assemble member 20 at place diametrically inwardly with respect to the first-row tapered rollers 18a thereby pressingly supporting the first-row tapered rollers 18a. By performing the step of fitting-in the retainer ring, the sub-assemble member 20 has the retainer ring 40 fixedly fitted therein. Since all of the first-row tapered rollers 18a are clamped between the retainer ring and the first cage 25, the first-row tapered rollers 18a never drop off whatever posture may be taken by the sub-assemble member 20.

Figure 7:
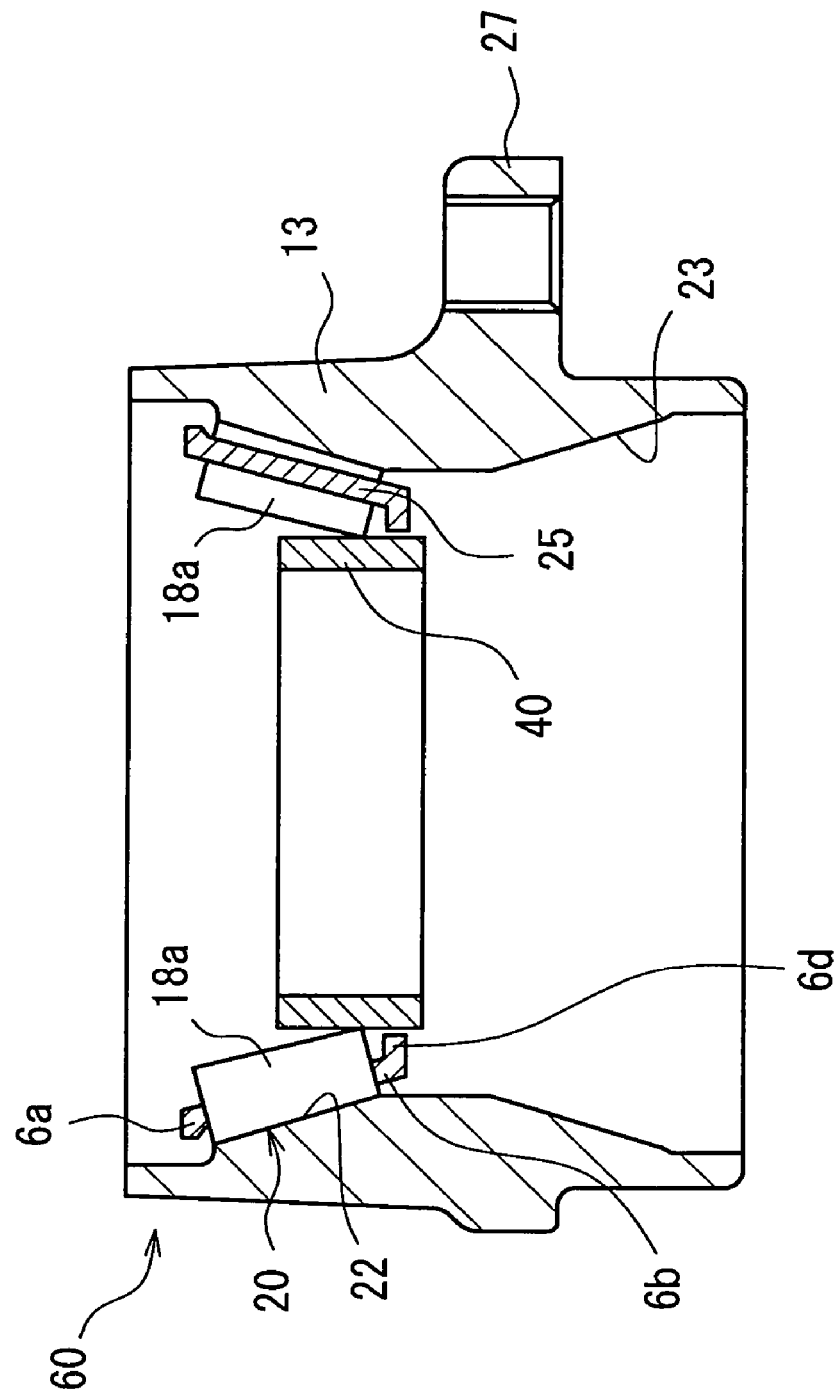
FIG. 7 is a sectional view showing a second step member according to the one embodiment of the invention.

Subsequently, a second step is performed to mount the resultant sub-assemble member 20 to the first outer raceway 22 of the outer ring 13. As a result of the second step, a second step member 60 combining the sub-assemble member 20, having the retainer ring 40 fitted therein, with the outer ring 13 is obtained, as shown in FIG. 7. That is, the sub-assemble member 20 with the retainer ring 40 fitted therein is mounted to the first outer raceway 22 of the outer ring 13, as shown in FIG. 7.

Figure 8:
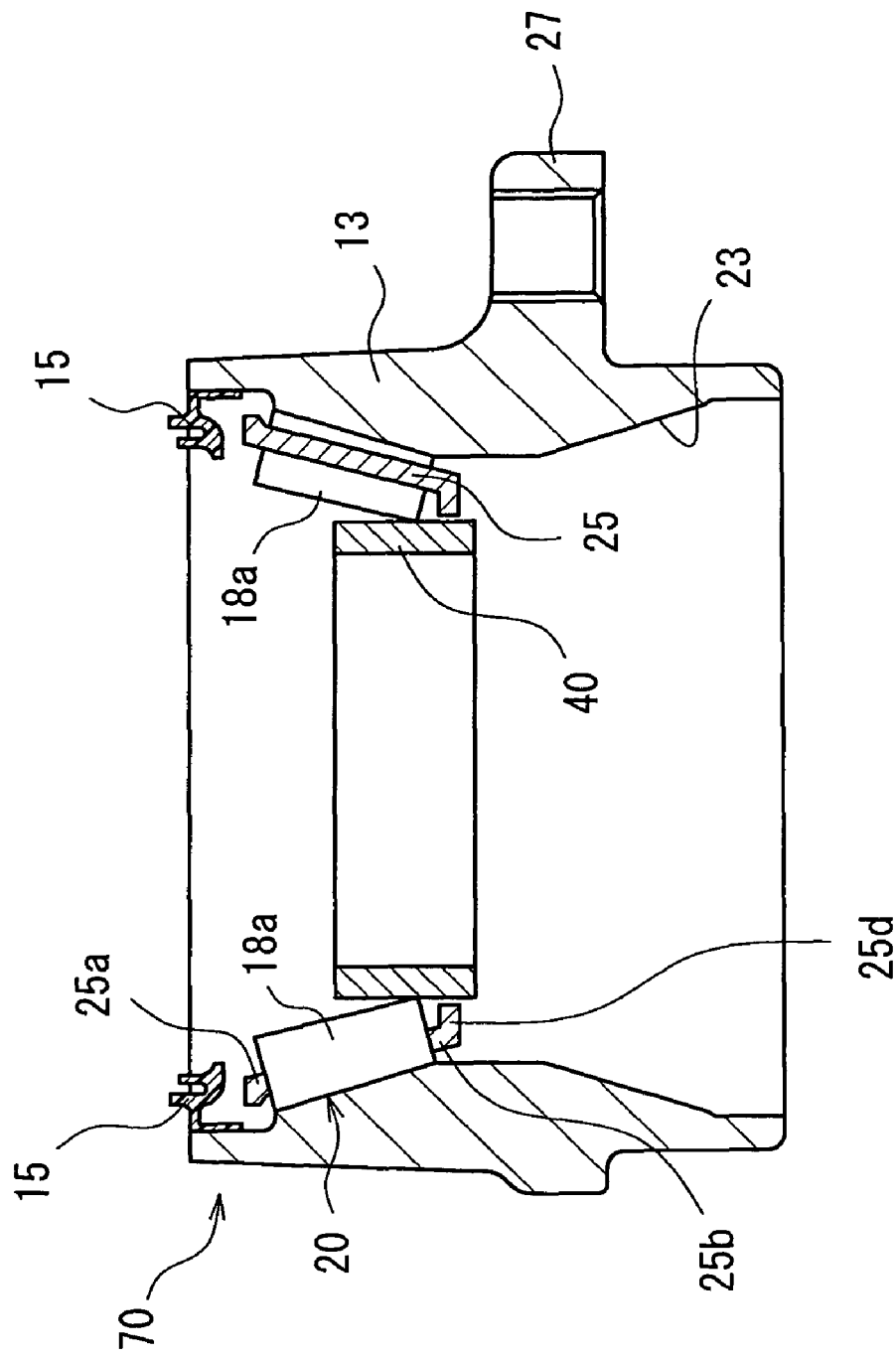
FIG. 8 is a sectional view showing a third step member according to the one embodiment of the invention.
Figure 9:
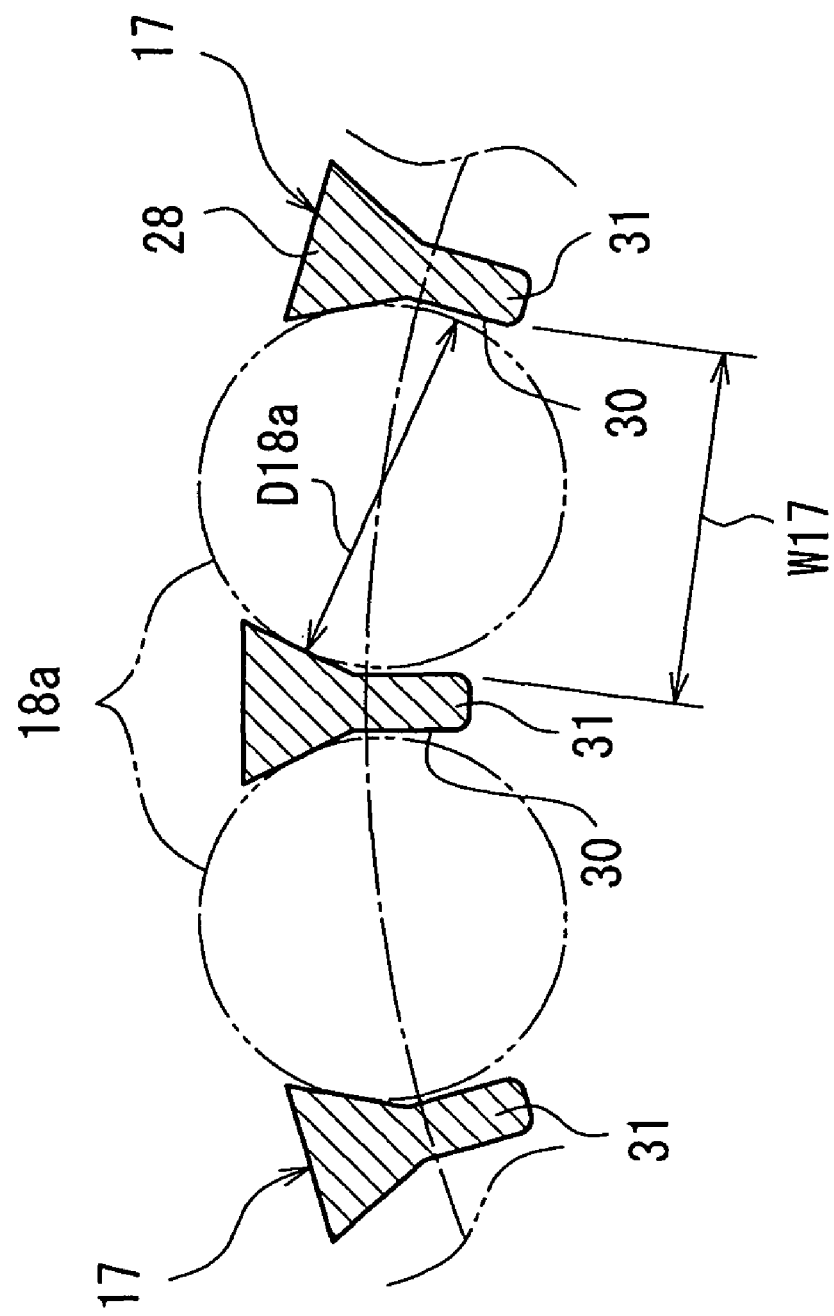
FIG. 9 is a sectional view showing ridges of a first cage of conventional example 2.
Figure 10:
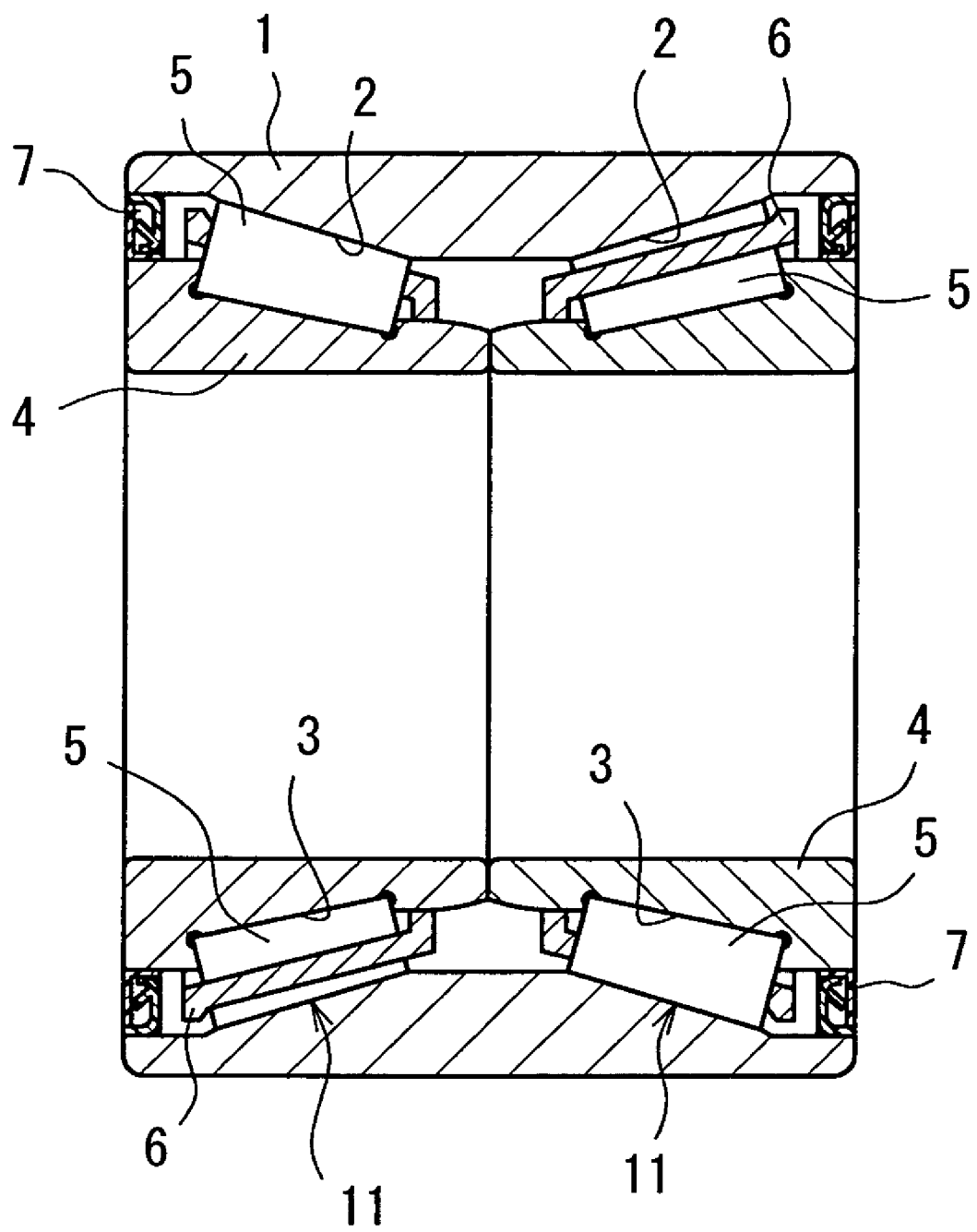
FIG. 10 is a sectional view showing a double-row tapered-roller bearing assembly of conventional example 1.
Figure 11:
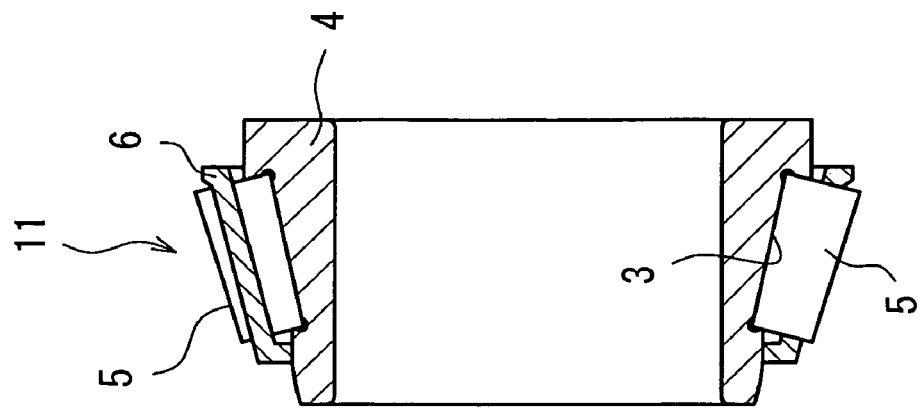
FIG. 11 is a sectional view showing an assembling step of the double-row tapered-roller bearing assembly of the conventional example 1.
Figure 11:
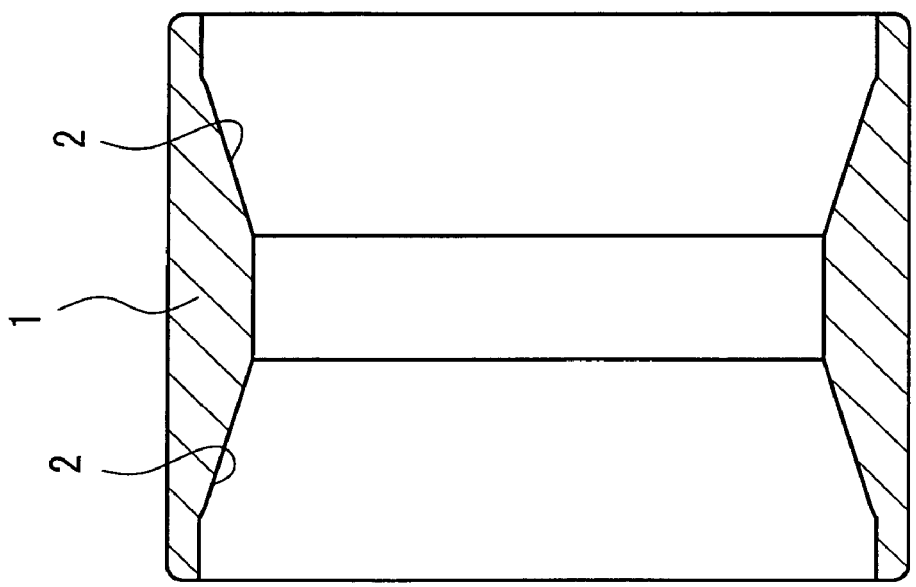
Figure 11:
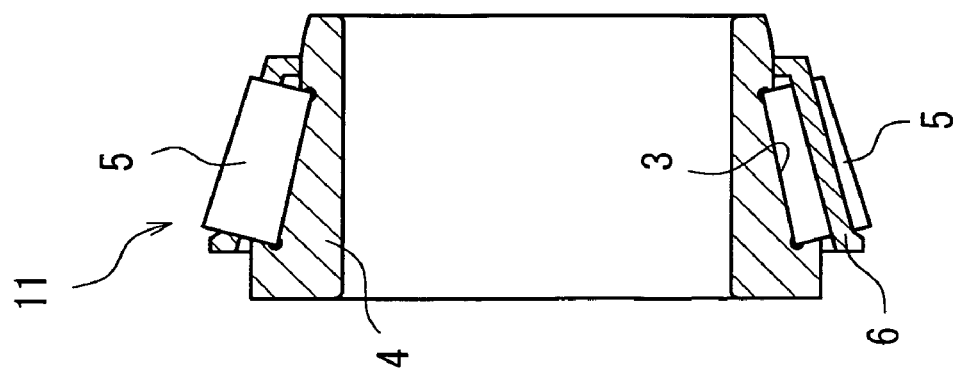
Figure 12:
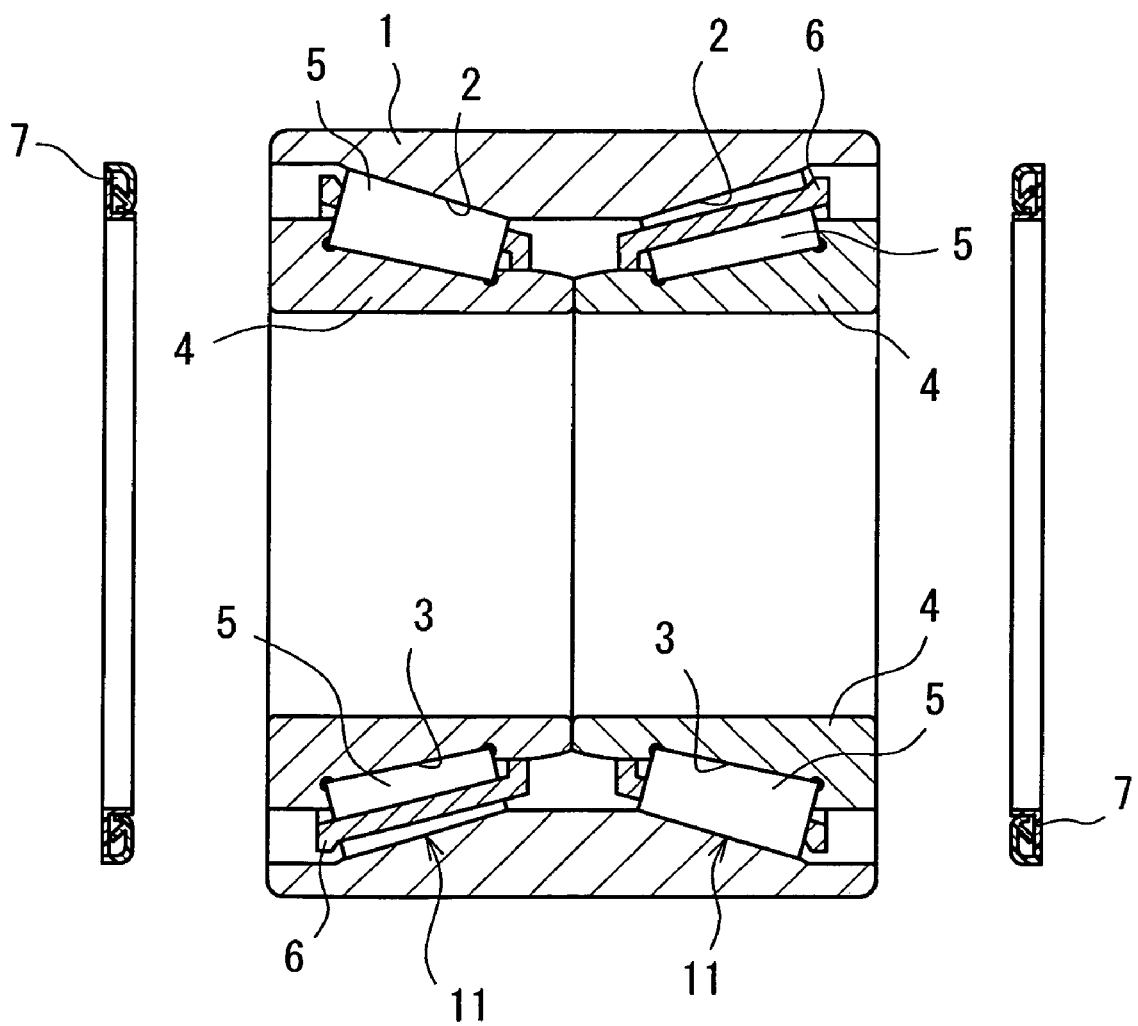
FIG. 12 is a sectional view showing an assembling step of the double-row tapered-roller bearing assembly of the conventional example 1.

In the subsequent third step, the first seal ring 15 is mounted to the second step member 60. The seal ring 15 is fitted in the outer ring 13 as fixed to the inner peripheral surface thereof at its end close to the first outer raceway 22. This step provides a third step member 70 as shown in FIG. 8.

Next, an operation of combining the third step member 70 with the hub body 16 is performed as a fourth step. More specifically, the fourth step is to mount the sub-assemble member 20 between the first inner raceway 28 and the first outer raceway 22 by fitting the sub-assemble member 20 on the first inner raceway 28 of the hub body 16 as pushing out the retainer ring 40 fitted in the sub-assemble member 20 by means of the smaller-diameter cylindrical step 38 which is the step defined between the smaller-diameter cylindrical surface portion 30 and the first inner raceway 28 of the hub body 16. Therefore, the third step member 70 is combined with the hub body 16 while at the same time, the retainer ring 40 fitted in the sub-assemble member 20 is disengaged therefrom as pushed out of the sub-assemble member 20. That is, the fourth step disengages the retainer ring 40 from the sub-assemble member 20 without requiring an operation of removing the retainer ring 40. In this step, the hub body 16 is normally inserted into the third step member 70 to combine these members.

In the subsequent fifth step, an inner ring member 80 is inserted into the outer ring 13 from its side opposite the smaller-diameter cylindrical surface portion 30 thereby fixedly fitting the inner ring 35 on the smaller-diameter cylindrical surface portion 30 of the hub body 16, the inner ring member 80 having the second-row tapered rollers 18b disposed in the individual pockets of the second cage 31 and clamped between the inner ring 35 and the second cage 31 (see FIG. 6). In the subsequent final step, the second seal ring 14 is mounted between the outer peripheral surface of the inner ring 35 at its end and the inner peripheral surface of the outer ring at its end. Thus is fabricated the roller bearing assembly shown in FIG. 6.

The embodiment takes the above procedure so that the first-row tapered rollers 18a in the sub-assemble member 20 do not drop off despite the posture of the sub-assemble member 20. Since the first step of assembling the sub-assemble member 20 is followed by fitting the retainer ring 40 in the sub-assemble member 20, the individual first-row tapered rollers 18a are clamped between the first cage 25 and the retainer ring 40 in the subsequent steps so as to be prevented from dropping off. The first cage 25 merely supports the tapered rollers 18a on the diametrical outer sides thereof but is not constructed to inhibit the tapered rollers 18a from inclining diametrically inwardly to drop off. However, the invention is adapted to obviate the drop-off of the first-row tapered rollers 18a by employing the retainer ring 40 for pressingly supporting the all first-row tapered rollers 18a from the diametrical inner side as fitted in the sub-assemble member 20. After the retainer ring 40 is fitted in the sub-assemble member 20, therefore, the individual steps may be performed without considering constraints on the postures of the individual members of the bearing assembly.

Figure 2:
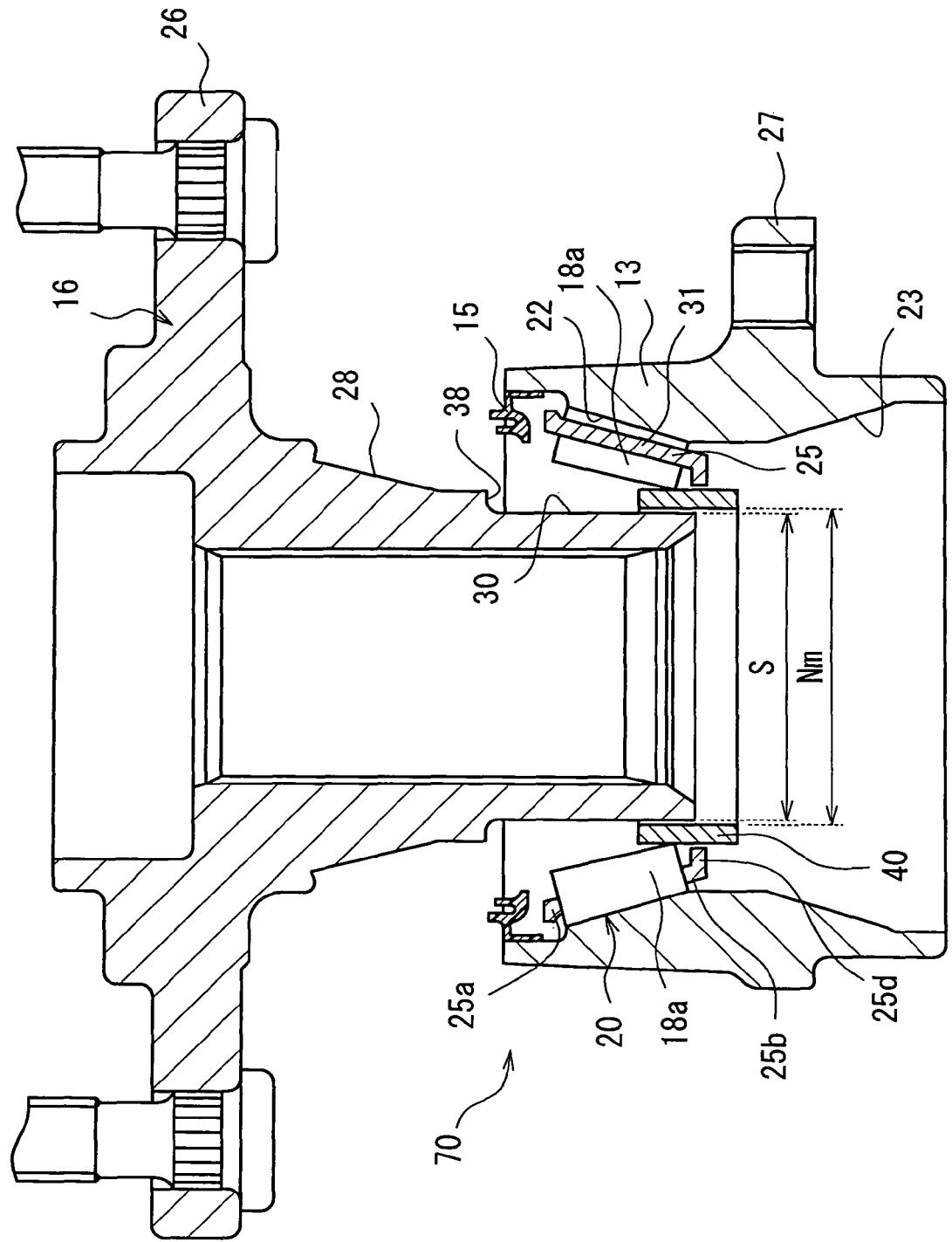
FIG. 2 is a sectional view showing a fourth step according to the one embodiment of the invention.
Figure 4:
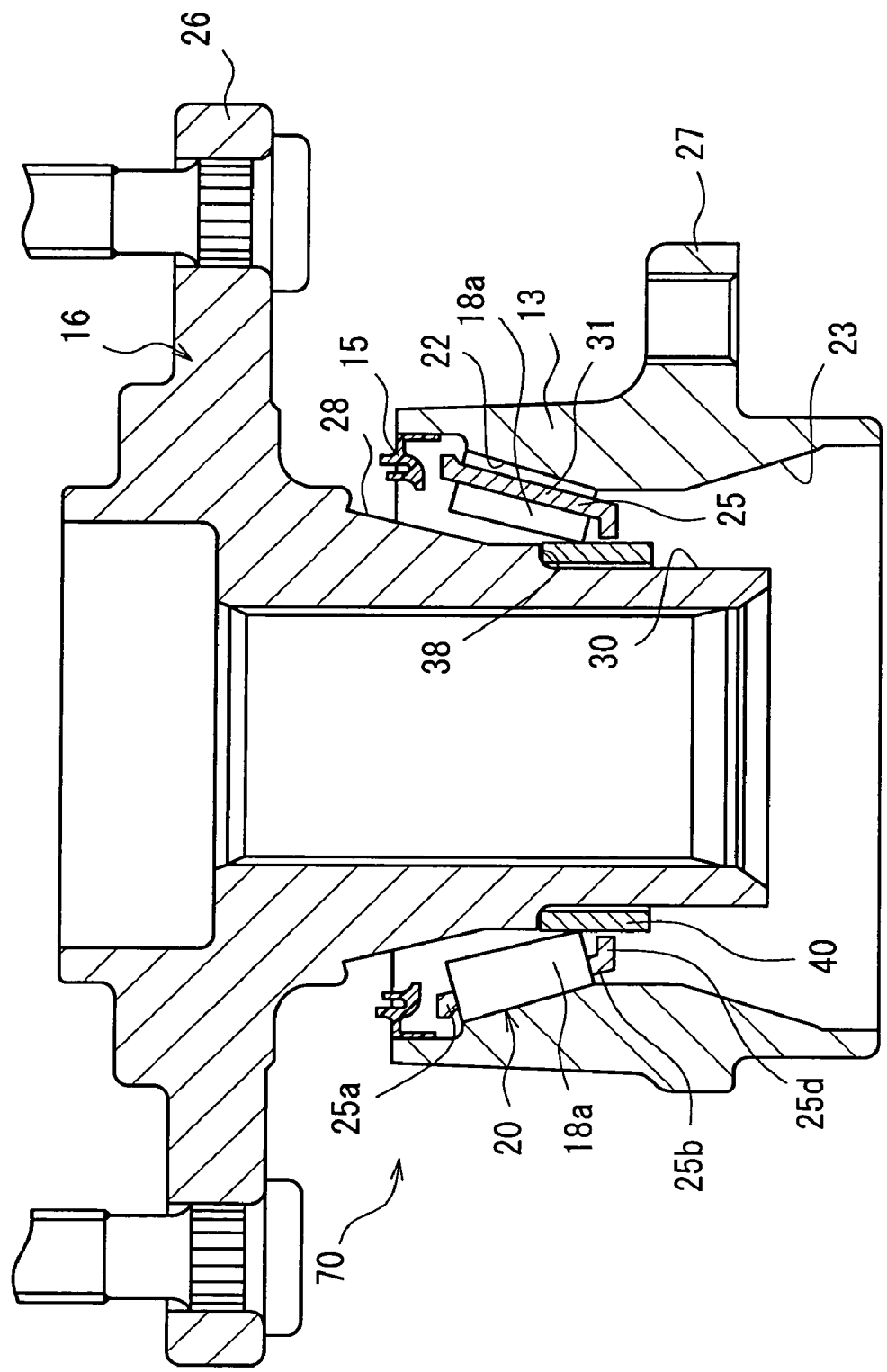
FIG. 4 is a sectional view showing the fourth step according to the one embodiment of the invention.
Figure 5:
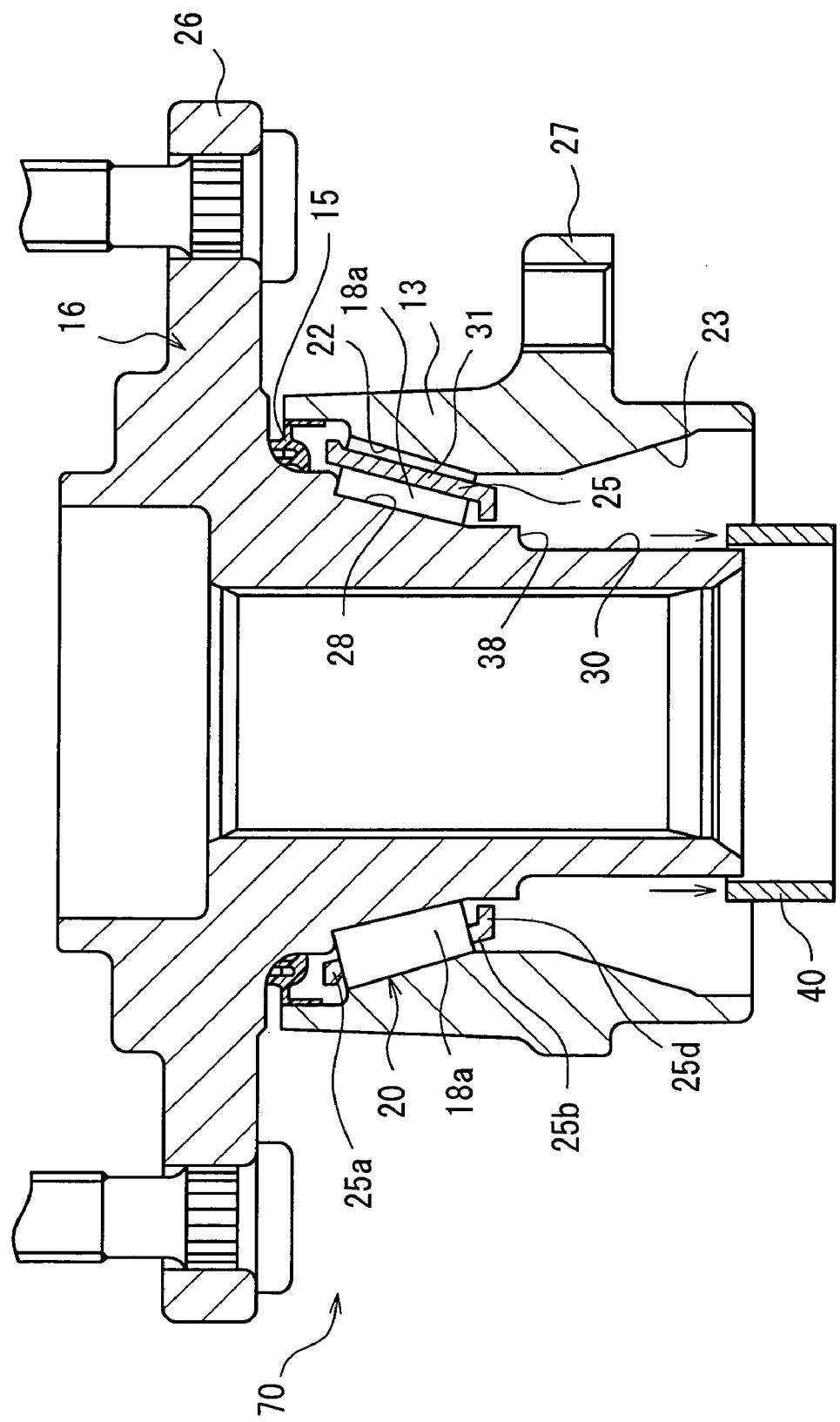
FIG. 5 is a sectional view showing a state where the retainer ring 40 is pushed out in the fourth step according to the one embodiment of the invention.

A detailed description is made on why the first-row tapered rollers 18a do not drop off in the fourth step as well. As shown in FIG. 2, an outside diameter S of the smaller-diameter cylindrical surface portion 30 of the hub body 16 is smaller than an inside diameter N of the retainer ring 40 and also than a minimum inside diameter Nm of the retainer ring 40 fitted in the sub-assemble member 20. Hence, the smaller-diameter cylindrical surface portion 30 of the hub body 16 is allowed to pass through the retainer ring 40 without pushing out the same during the fourth step. That is, the retainer ring 40 is maintained in the state attached to the sub-assemble member 20 until the smaller-diameter cylindrical step 38 of the hub body 16 abuts against the retainer ring 40, as shown in FIG. 4. Then, as shown in FIG. 5, the retainer ring 40 is pushed out by the smaller-diameter cylindrical step 38 as the step defined between the smaller-diameter cylindrical surface portion 30 and the first inner raceway 28 of the hub body 16, while the tapered rollers 18a are mounted on the first inner raceway 28 of the hub body 16. Thus, all the first-row tapered rollers 18a are arranged between the first inner raceway 28 and the first outer raceway 22 and the fourth step is completed.

If this arrangement is made wherein the inside diameter N of the retainer ring 40 and the minimum inside diameter Nm of the retainer ring 40 fitted in the sub-assemble member 20 are defined to be greater than the outside diameter S of the smaller-diameter cylindrical step 38 so that the retainer ring 40 may be pushed out by the smaller-diameter cylindrical step 38 as the step defined between the smaller-diameter cylindrical surface portion 30 and the first inner raceway 28 of the hub body 16, the smaller-diameter cylindrical step 38 reaches a place in the vicinity of the innermost points $\alpha$ of the tapered rollers 18a when the retainer ring 40 is pushed out. Because of the existence of the hub body 16, therefore, the tapered rollers 18a cannot drop diametrically inwardly. In the fourth step as well, the first-row tapered rollers 18a do not drop off despite the posture thereof.

There is no need for considering the drop-off of the tapered rollers in the fifth step and the subsequent steps. The first-row tapered rollers 18a involve no fear of drop-off because the rollers are clamped between the first outer raceway 22 and the first inner raceway 28. Likewise to the conventional example 1, the second-row tapered rollers 18b may be handled as integrally combined with the inner ring 35 and the second cage 31. The second-row tapered rollers are clamped between the second cage 31 and the second inner raceway 36, thus involving no fear of drop-off. This negates the need for considering the postures of the individual members for the sake of obviating the drop-off of the tapered rollers. In the fifth step, the fourth step member fabricated in the fourth step (see FIG. 5) may be placed in a posture in which the one end (the side formed with the flange 26) of the hub body 16 lies underneath the other end thereof (the smaller-diameter cylindrical surface portion 30 of the outer ring 13), in order to facilitate the insertion of the inner ring member 80, for example. In this state, the inner ring member 80 may be inserted from above (the outer raceway-23 side of the outer ring 13).

Figure 3:
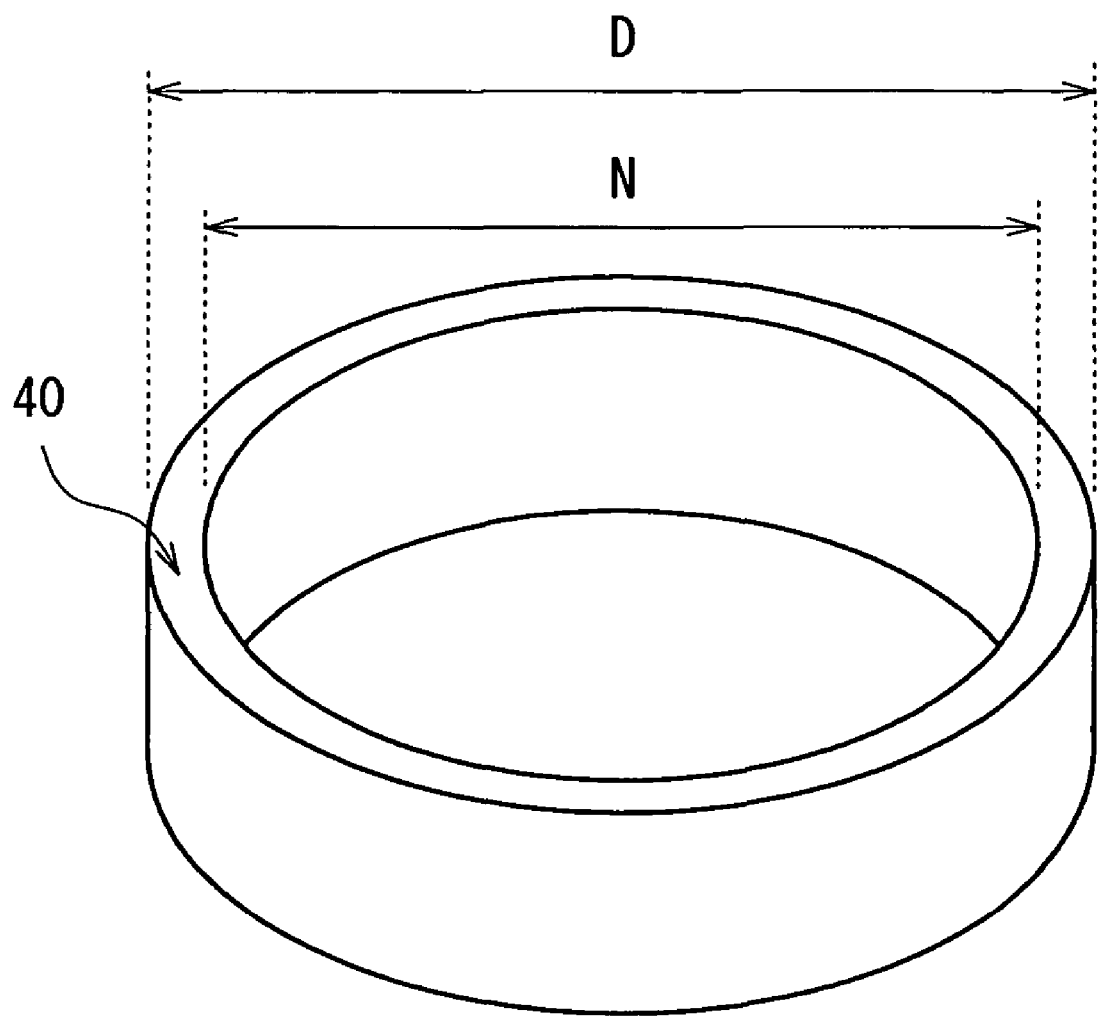
FIG. 3 is a perspective view showing the retainer ring 40 according to the one embodiment of the invention.

FIG. 3 shows the retainer ring 40 in perspective. This ring is a cylindrical ring and is formed from a elastically deformable resin or the like. Provided that the innermost points $\alpha$ of the first-row tapered rollers 18a with respect to the diametrical direction of the first row of tapered rollers is represented by $\alpha$ and a diameter of a circle passing through all the points $\alpha$ of the tapered rollers is represented by $D\alpha$, as shown in the sectional view of FIG. 1 depicting the sub-assemble member 20 with the retainer ring 40 attached thereto, an outside diameter D of the retainer ring 40 is slightly greater than the diameter $D\alpha$. Therefore, the retainer ring 40 is fixed in the sub-assemble member 20 as elastically deformed and fitted diametrically inwardly of the first row of tapered rollers 18a. The retainer ring 40 contacts all the first-row tapered rollers 18a at the innermost points $\alpha$, and also supports all the first-row tapered rollers 18a as pressing on the respective points $\alpha$ from the diametrically inner side by way of a restoring force resulting from the elastic deformation. As long as the retainer ring 40 is fixedly fitted in the sub-assemble member 20 in this manner, the first-row tapered rollers 18a are clamped between the retainer ring 40 and the first cage 25. Accordingly, none of the first-row tapered rollers 18a drops off whatever posture may be taken by the sub-assemble member 20.

If in the fourth step, the hub body 16 is so postureed as to direct its rotary axis vertically and to present the flange 26 upwardly relative to the smaller-diameter cylindrical surface portion 30, the retainer ring 40 so pushed out will fall under the gravitational pull. If the hub body 16 is postureed otherwise, the retainer ring 40 disengaged from the sub-assemble member 20 may be taken out properly. Thus, the step of removing the retainer ring 40 from the sub-assemble member 20 is obviated. The retainer ring 40 may be recovered for reuse.

While the first step is immediately followed by the step of fitting in the retainer ring according to the embodiment, the invention is not limited to this. What is required is that the retainer ring 40 be fitted in the sub-assemble member 20 at least before the fourth step. That is, the step of fitting in the retainer ring may be performed subsequent to the third step and thereafter, the fourth step may be performed. This procedure involves the problem about the drop-off of the first-row tapered rollers 18a because the retainer ring 40 is not used during a period between the end of the first step and the start of the third step. That is, in a case where the retainer ring 40 is not mounted to the sub-assemble member 20, the sub-assemble member 20 must be maintained in a posture in which the greater ring 6a of the first cage 25 constituting the member is positioned upwardly relative to the smaller ring 6b of the first cage 25, in which the rotary axis of the sub-assemble member 20 is directed vertically, and in which a plane contacting the greater ring 6a extends substantially horizontally.

However, the fourth step is to handle the hub body 16, which is a particularly bulky and heavy member of the roller bearing assembly of the invention. Hence, a great effect may be afforded if only the fourth step is released from the constraints on the postures of the members. Specifically, the retainer ring 40 may be used in the fourth step thereby permitting the third step member 70 to be postureed to direct the rotary axis of the bearing horizontally and also permitting the hub body 16 to be inserted as postureed to direct its rotary axis horizontally. Alternatively, the hub body 16 may be placed in the posture in which the other end thereof (the smaller-diameter cylindrical surface portion-30 side) is postureed upwardly relative to the one end thereof (the side formed with the flange 26) and the rotary axis thereof is directed vertically and in this state, the hub body may be combined with the third step member 70. If the retainer ring 40 is fitted in the sub-assemble member 20 particularly in the fourth step, the great effect may be afforded because the constraint on the posture of the hub body 16, in particular, is eliminated. However, it is more preferred to perform the step of fitting in the retainer ring immediately after the first step as suggested by the embodiment. This approach releases the individual members from the postureal constraints in the individual assembling steps subsequent to the step of fitting in the retainer ring, or during an assembly flow from the transportation of a single body of the sub-assembly member 20 to the completion of the roller bearing assembly.

According to the embodiment, the step portion formed between the smaller-diameter cylindrical surface portion 30 and the first inner raceway 28 of the hub body 16 is defined by the smaller-diameter cylindrical step 38 constituting the start point at the one end (the side formed with the flange 26) of the smaller-diameter cylindrical surface portion 30. However, the step portion is not limited to this. Specifically, an additional step portion to the smaller-diameter cylindrical step 38 may be provided (or the smaller-diameter cylindrical step 38 may be omitted), such that retainer ring 40 may be pushed out by this step portion. If the step portion for pushing out the retainer ring 40 is disposed at place between the smaller-diameter cylindrical surface portion 30 and the first inner raceway 28, this step portion reaches the place in the vicinity of the innermost points α of the tapered rollers 18a when pushing out the retainer ring 40. Hence, the tapered rollers 18a are inhibited from dropping diametrically inwardly by the existence of the hub body 16. As a result, all the first-row tapered rollers 18a are prevented from dropping off. However, it is more preferred, as suggested by the embodiment, that the step portion disposed between the smaller-diameter cylindrical surface portion 30 and the first inner raceway 28 of the hub body 16 includes the smaller-diameter cylindrical step 38 alone, which is used for pushing out the retainer ring 40. Since the smaller-diameter cylindrical step 38 also serves as the step portion for pushing out the retainer ring 40, it is unnecessary for forming the additional step portion to the smaller-diameter cylindrical step 38.

A material of the retainer ring 40 may preferably be one which is elastically deformable to permit the retainer ring to be fitted in the sub-assemble member 20 at place diametrically inwardly with respect to the first-row tapered rollers 18a, as described above, and which provides the restoring force based on the elasticity such as to permit the fit-in retainer ring to press the tapered rollers 18a from the diametrically inner side. Examples of the material having such properties include resins, rubbers, elastomers and the like. The configuration of the retainer ring 40 is not limited to the cylindrical shape of the embodiment. The retainer ring may have any configuration that permits the smaller-diameter cylindrical surface portion 30 of the hub body 16 to be inserted therethrough and permits the step portion disposed between the smaller-diameter cylindrical surface portion 30 and the first inner raceway 28 of the hub body 16 to push out the retainer ring.

Figure 17:
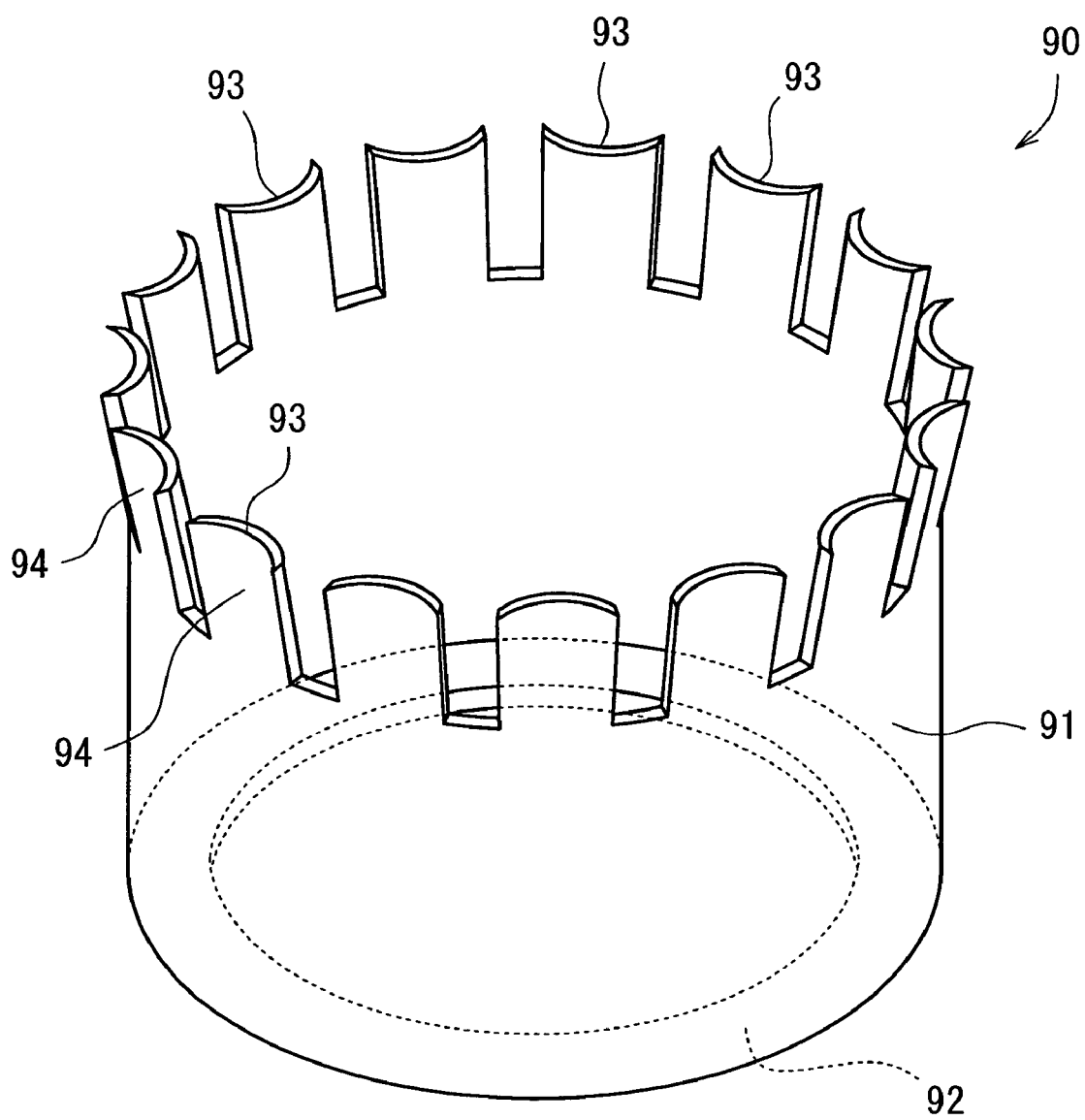
FIG. 17 is a perspective view showing a retainer used in a second embodiment of the invention.
Figure 18:
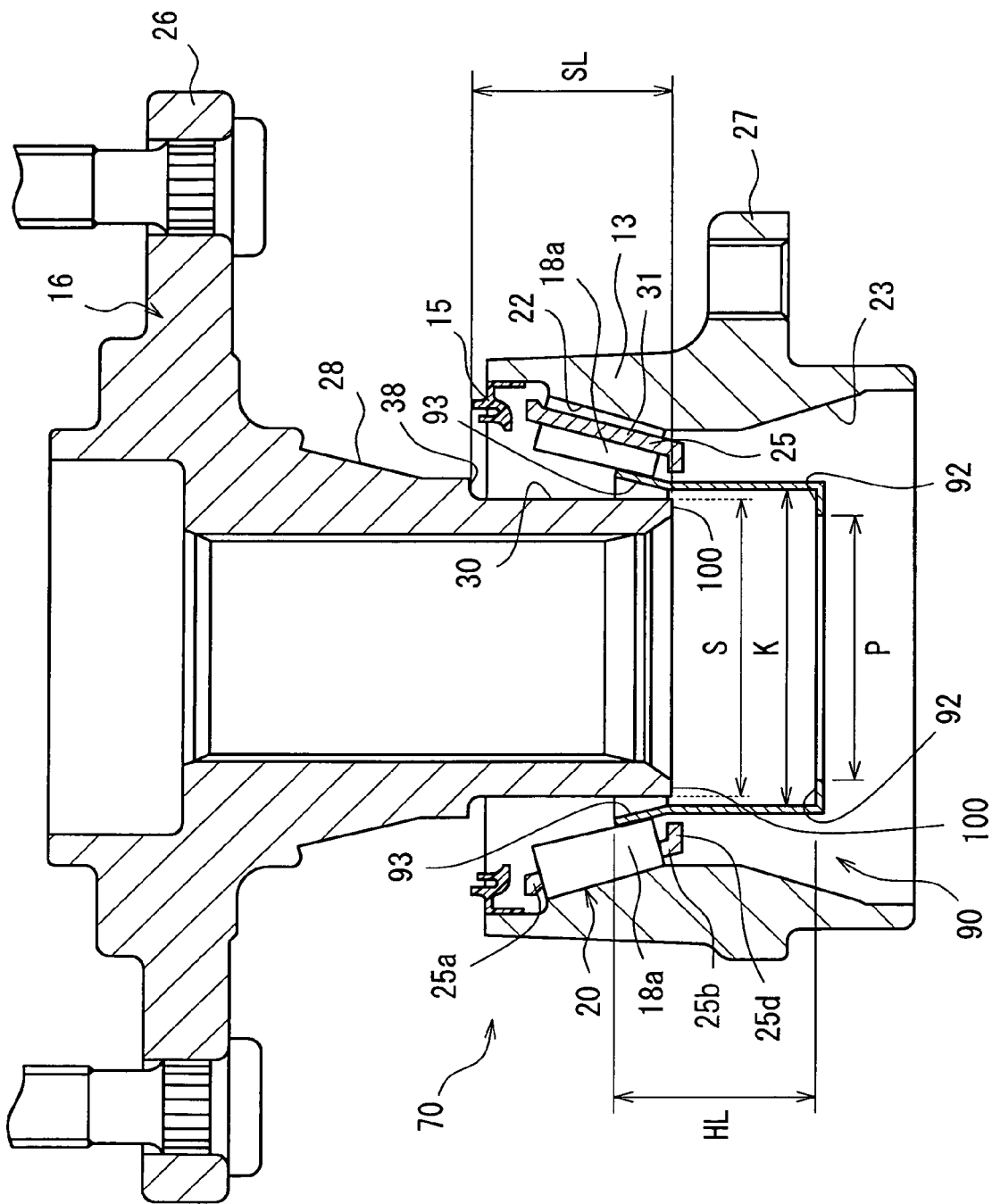
FIG. 18 is a sectional view showing a step of pushing out the retainer according to the second embodiment of the invention.
Figure 19:
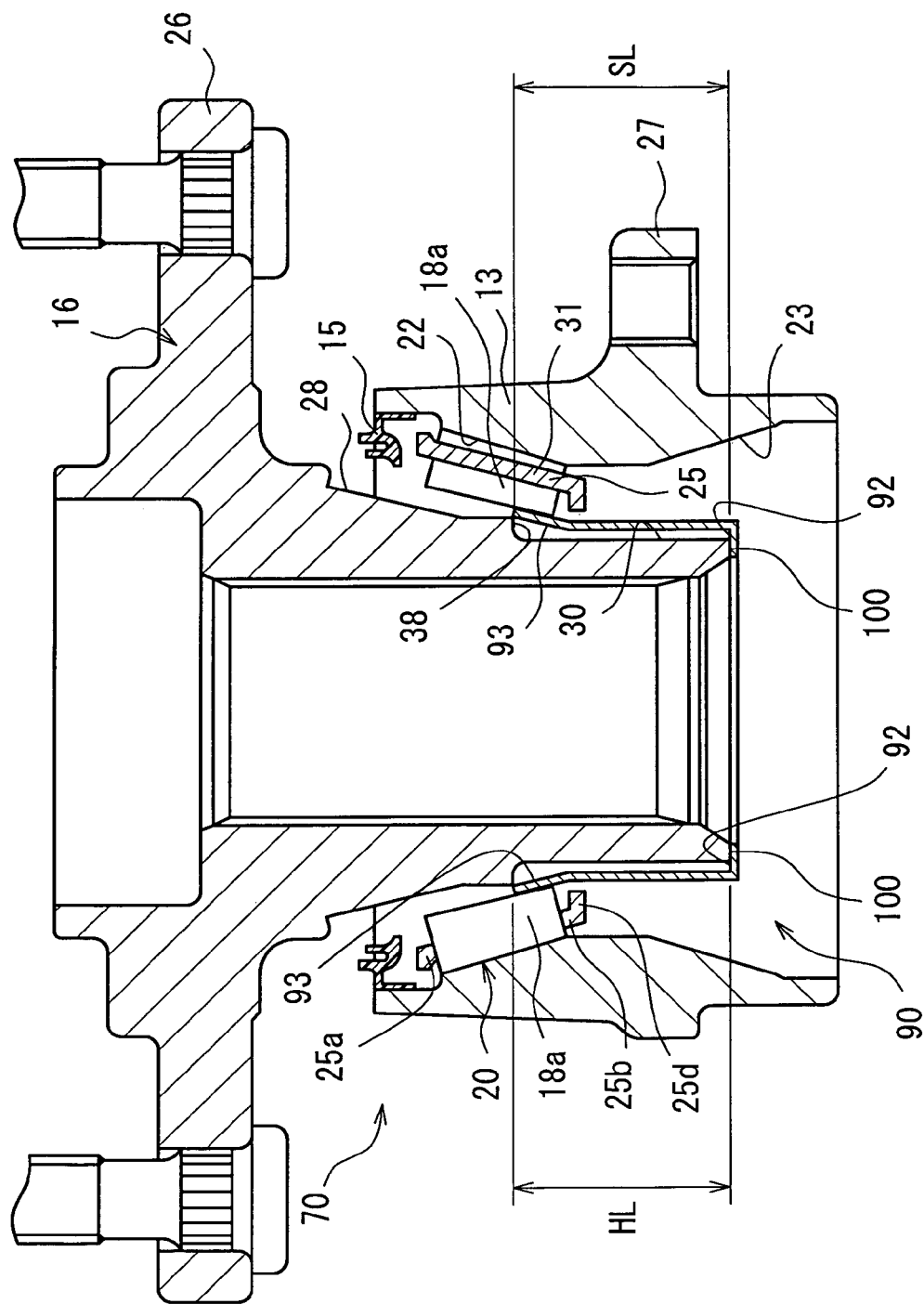
FIG. 19 is a sectional view showing the step of pushing out the retainer according to the second embodiment of the invention.
Figure 20:
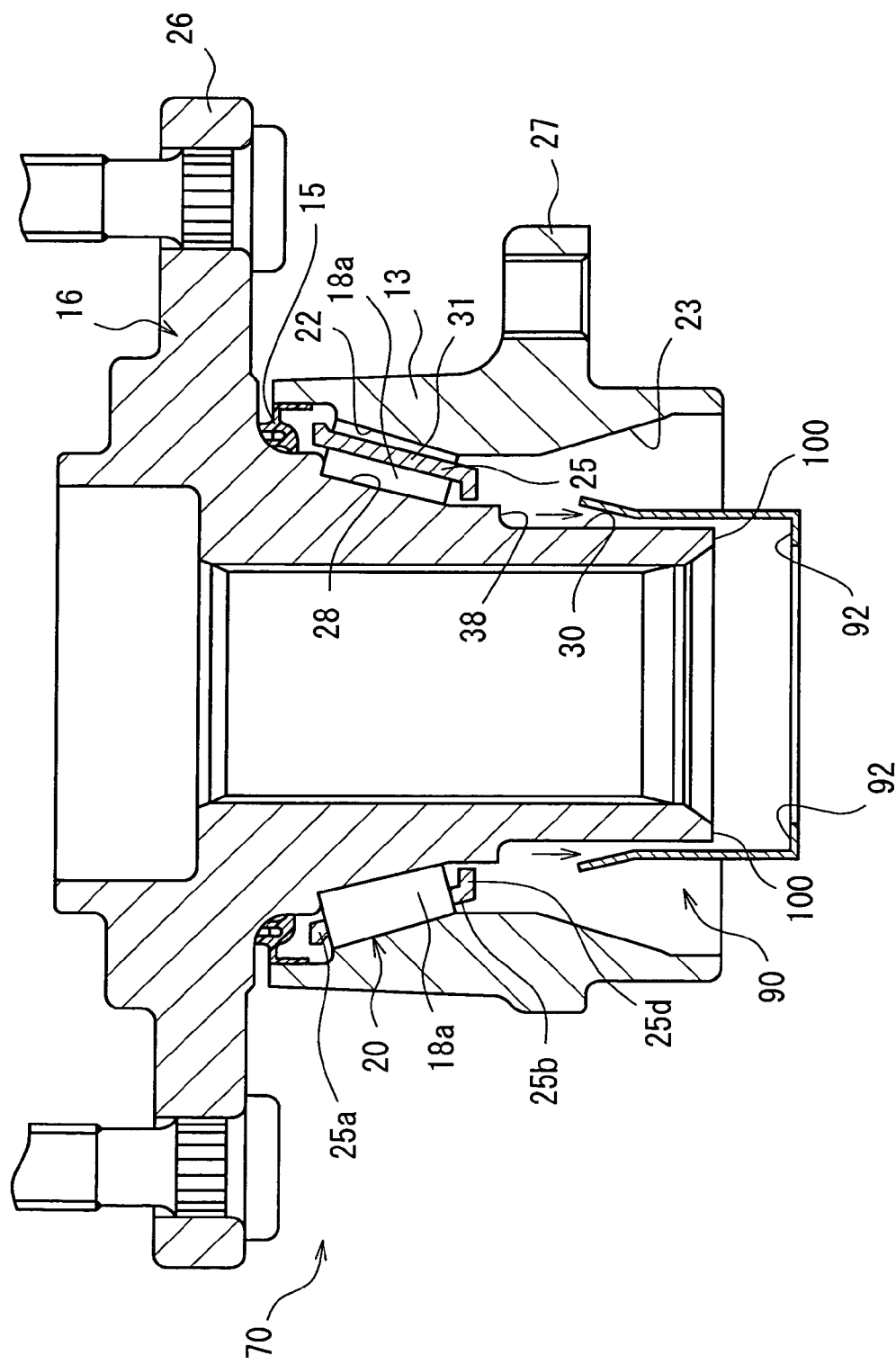
FIG. 20 is a sectional view showing the step of pushing out the retainer according to the second embodiment of the invention.

FIG. 17 is a perspective view showing a retainer 90 used in an assembling method for roller bearing assembly according to a second embodiment of the invention. FIG. 18 to FIG. 20 are diagrams each explaining the assembling method of the second embodiment using this retainer 90. A roller bearing assembly assembled by the assembling method using the retainer 90 is absolutely the same as the bearing assembly (shown in FIG. 6) assembled by the assembling method of the first embodiment using the retainer ring 40. The retainer 90 is similar to the aforementioned retainer ring 40 in that the retainer is fitted in the sub-assemble member 20 for the sake of preventing the drop-off of the first-row tapered rollers 18a and that the retainer is pushed out by the hub body 16 during the assembling work. However, the retainer 90 differs from the retainer ring 40 with respect to the configuration thereof, the abutment position against the hub body 16 when pushed out by the hub body 16, and the mode of supporting the first-row tapered rollers 18a. The following description is made on the assembling method using the retainer 90, focusing on these differences.

The second embodiment uses the retainer 90 shown in FIG. 17, instead of the retainer ring 40 used by the method according to the first embodiment. Similarly to the first embodiment, the sub-assemble member 20 combining the first cage 25 with the first-row tapered rollers 18a is fabricated. Thereafter, the retainer 90 is fitted in the sub-assemble member at place diametrically inwardly with respect to the first-row tapered rollers 18a, so as to support the first-row tapered rollers 18a (see FIG. 18).

As shown in FIG. 17, the retainer 90 includes: a cylindrical main body 91; a hub-body distal-end abutment portion 92 having an annular shape and extending radially inwardly from one axial end of the main body 91; and roller abutment portions 93 defined by a plurality of tongues extended from the other axial end of the main body 91 as skewed radially outwardly and arranged at regular space intervals so as to abut against the respective first-row tapered rollers 18a in a state where the retainer is fitted in the sub-assemble member 20. The retainer is provided with as many roller abutment portions 93 as the first-row tapered rollers 18a. Furthermore, the roller abutment portions are circumferentially arranged with equal spacing in correspondence to the respective postures of the first-row tapered rollers 18a.

As described above, the retainer 90 is configured differently from the aforementioned retainer ring 40 of the simple cylindrical shape. Hence, the retainer supports the tapered rollers in a different mode from that of the retainer ring. Specifically, the retainer ring 40 contacts the first-row tapered rollers 18a at the innermost postures α of the tapered rollers, as shown in FIG. 1. In contrast, the retainer 90 has the configuration shown in FIG. 17, while the roller abutment portions 93 contact the respective first-row tapered rollers 18a substantially in conformity therewith, as shown in FIG. 18. Therefore, the retainer supports the first-row tapered rollers more stably than the retainer ring 40 providing point support for the tapered rollers 18a. Since the roller abutment portions 93 are arranged on a circumference of the other axial end of the main body 91 in one-to-one correspondence to the tapered rollers 18a, the individual roller abutment portions assuredly abut against the respective tapered rollers 18a. Furthermore, each of the roller abutment portions 93 has an abutment face 94 against the first-row tapered roller 18a, which is concaved conforming to the shape of the first-row tapered roller 18a. Thus, each of the roller abutment portions supports each of the tapered rollers 18a as receiving the roller on such a concaved face. Therefore, the first-row tapered rollers 18a are supported quite stably.

In this manner, the retainer 90 is fitted in the sub-assemble member 20 to establish a state where the first-row tapered rollers 18a are stably supported. Thereafter, the step of mounting the sub-assemble member 20 to the first outer raceway 22 of the outer ring 13 is performed and is followed by the steps of mounting the first seal ring 15 and combining the hub body 16 with the resultant assemble member. These steps are the same as those of the first embodiment. However, a method of pushing out the retainer 90 by means of the hub body 16 differs from the method of pushing out the retainer ring 40 according to the first embodiment. In the first embodiment, the smaller-diameter cylindrical step 38 abuts against the end of the retainer ring 40 so as to push out the retainer ring 40, as shown in FIG. 4. According to the second embodiment, on the other hand, an axial distal end 100 of the hub body 16 abuts against the hub-body distal-end abutment portion 92 of the retainer 90 so as to push out the retainer 90, as shown in FIG. 18. The provision of the hub-body distal-end abutment portion 92 ensures that the retainer 90 is positively pushed out. In addition, the retainer 90 is formed from a elastically deformable material so that the retainer is pushedly slid out of the sub-assemble member 20, as allowing the roller abutment portions 93 to be deformably oriented diametrically inwardly of the retainer 90 for axially conforming to the rollers in the course of the extruding process.

The dimensions of the individual parts of the retainer 90 are defined as follows for the sake of positive extrusion of such a retainer 90. First, as shown in FIG. 18, an inside diameter K of the main body 91 of the retainer 90 is defined to be greater than the outside diameter S of the smaller-diameter cylindrical surface portion 30. Thus, the retainer 90 and the hub body 16 do not interfere with each other until the axial distal end 100 of the hub body 16 abuts against the hub-body distal-end abutment portion 92. Since an inside diameter P of the hub-body distal-end abutment portion 92 of the annular shape is smaller than the aforesaid outside diameter S, the axial distal end 100 of the hub body 16 abuts against the hub-body distal-end abutment portion 92. The hub-body distal-end abutment portion 92 may not have the annular shape but may have any shape that permits the axial distal end 100 of the hub body 16 to abut against hub-body distal-end abutment portion 92. Furthermore, the above diameter may be P=O. That is, the hub-body distal-end abutment portion 92 may define a bottom face closing the axial one end of the main body 91.

Furthermore, an axial length HL of the retainer 90 (length from an inside surface of the hub-body distal-end abutment portion 92 to an end of the roller abutment portion 93) (see FIG. 18, FIG. 19) is substantially equal to an axial length SL from the smaller-diameter cylindrical step 38 to the axial distal end 100 of the hub body 16. If the length HL is too small, the retainer 90 is pushed out before the smaller-diameter cylindrical step 38 of the hub body 16 approaches the first-row tapered rollers 18a. Hence, the first-row tapered rollers 18a may be released from the retained state too early. Conversely if the length HL is too great, the roller abutment portions 93 of the retainer 90 are maintained in abutment against the tapered rollers 18a even when the first-row tapered rollers 18a approach as close as almost abut against the first inner raceway 28. Hence, the roller abutment portions 93 may be clamped between the first inner raceway 28 and the first-row tapered rollers 18a. It is therefore preferred that the length HL is substantially equal to the aforesaid length SL and SL≧HL.

Figure 21:
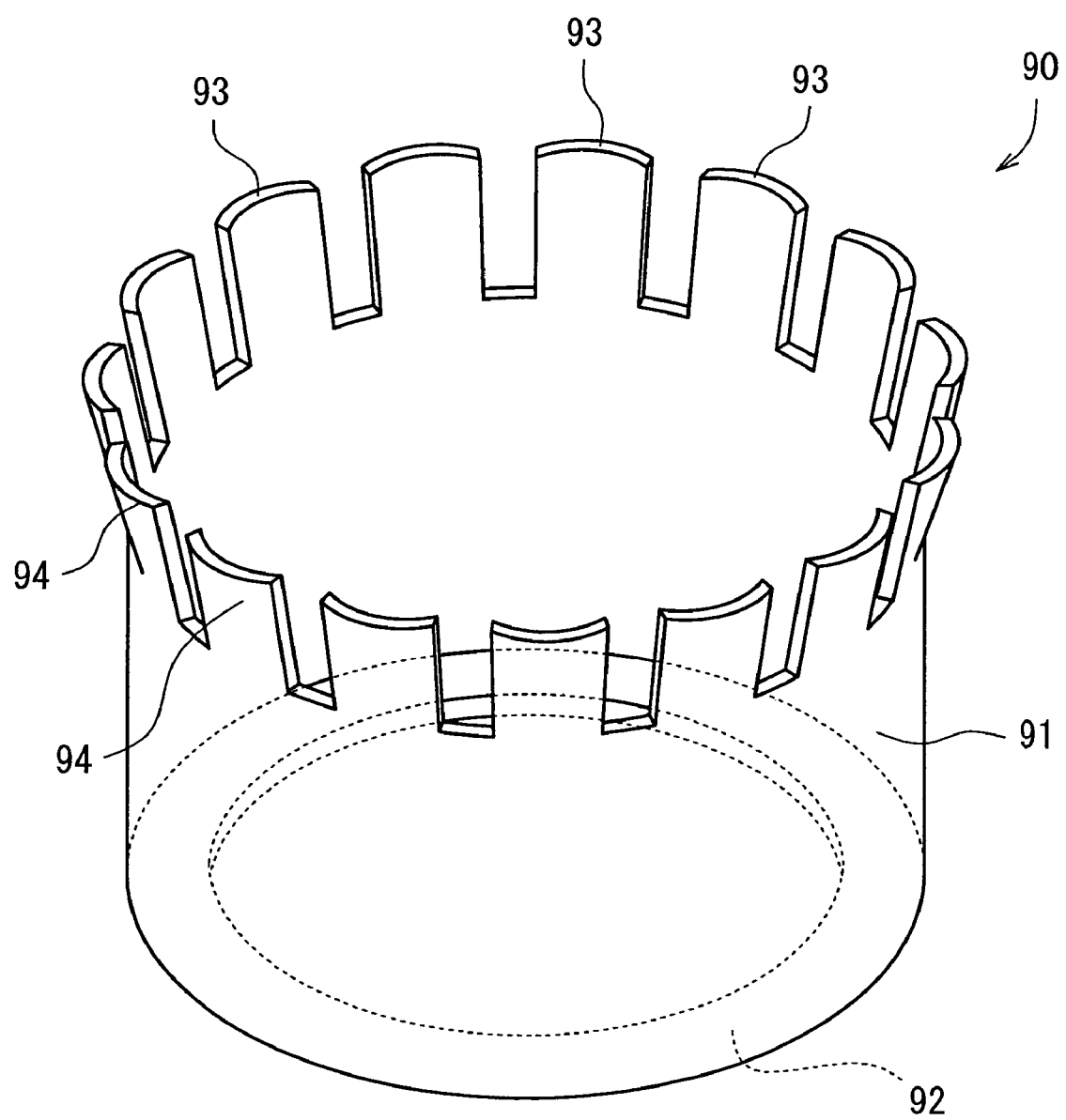
FIG. 21 is a perspective view showing a retainer used in a third embodiment of the invention.

FIG. 21 is a perspective view showing a retainer 90 used in an assembling method for roller bearing assembly according to a third embodiment of the invention. The assembling method for roller bearing assembly according to the third embodiment is basically the same as the assembly method according to the second embodiment. In this regard, the description is dispensed with. A difference from the second embodiment consists in the configuration of the roller abutment portions 93 of the retainer 90 and in the positional relation between the retainer 90 and the first-row tapered rollers 18a (the position of the retainer 90 with respect to the circumferential direction).

According to the second embodiment, the roller abutment portion 93 is configured to include the concaved abutment face against the tapered roller 18a (or the abutment face convexed radially inwardly of the retainer 90, see FIG. 17). Conversely, the roller abutment portion 93 of the third embodiment shown in FIG. 21 is configured to include a convexed abutment face against the tapered roller 18a (the face convexed radially outwardly of the retainer 90).

Figure 22:
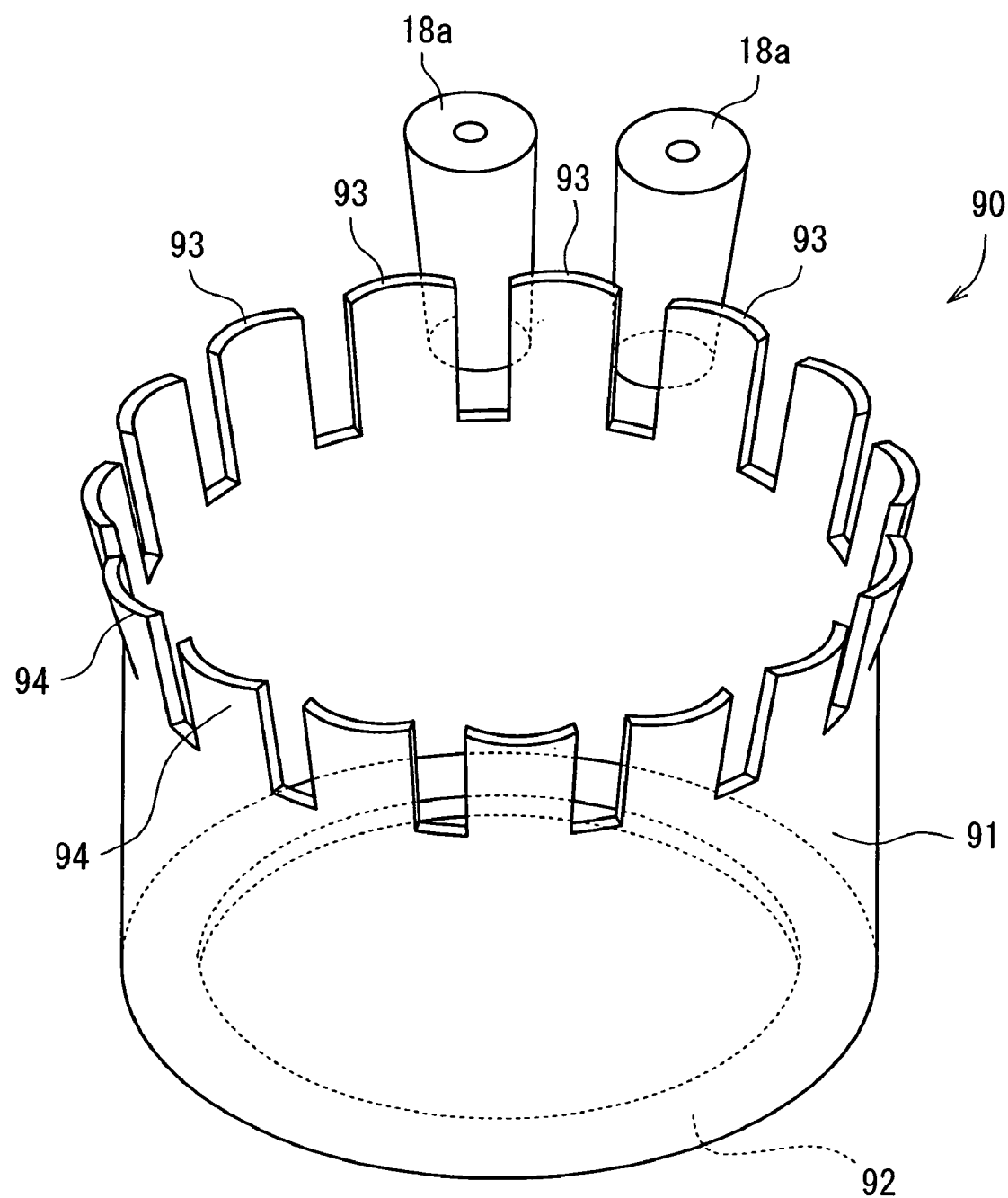
FIG. 22 is a perspective view showing how the retainer of FIG. 21 supports tapered rollers.

The circumferential positional relation between the retainer 90 and the first-row tapered rollers 18a differs as follows. In the second embodiment, the respective roller abutment portions 93 of the retainer 90 are located at the same circumferential positions (phase) of the respective first-row tapered rollers 18a so that one roller abutment portion 93 supports one first-row tapered roller 18a. According to the third embodiment, on the other hand, the respective circumferential positions (phases) of the roller abutment portion 93 and the first-row tapered roller are shifted from each other, as shown in FIG. 22, so that each first-row tapered roller 18a is located between each pair of adjoining roller abutment portions 93. Thus, each pair of adjoining roller abutment portions 93 cooperatively support one tapered roller 18a. Incidentally, FIG. 22 depicts the retainer 90 and only two of the plural first-row tapered rollers 18a abutted against the roller abutment portions 93, omitting the other first-row tapered rollers 18a.

Figure 23:
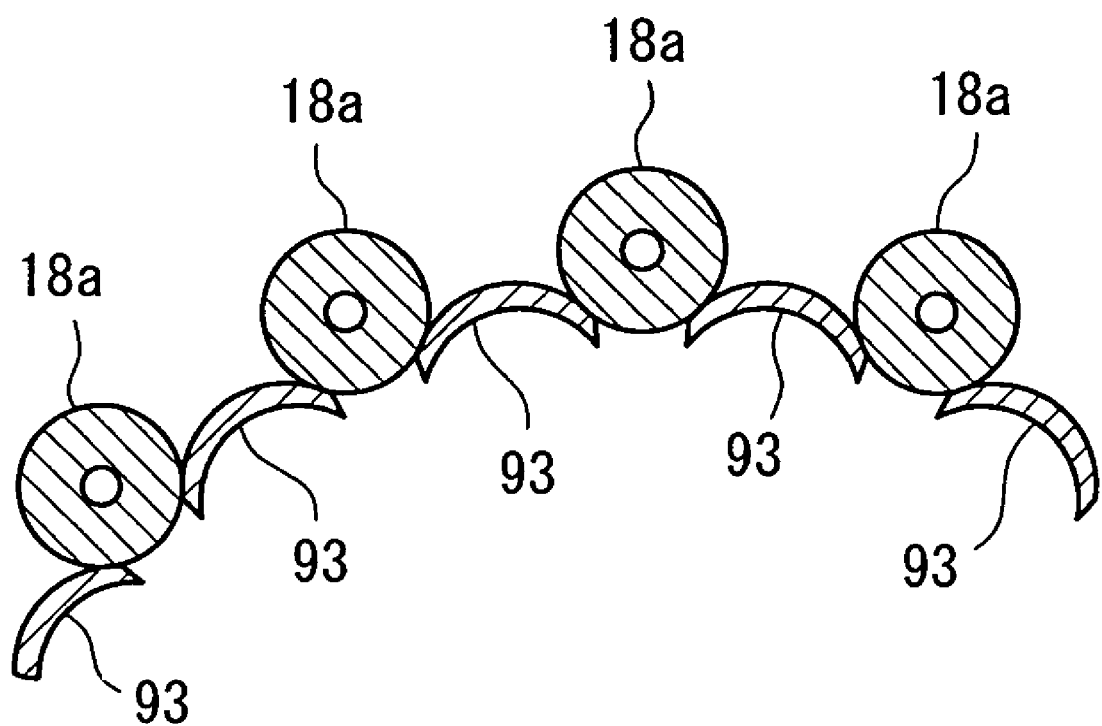
FIG. 23 is a sectional view showing how the retainer of FIG. 21 supports the tapered rollers.

FIG. 23 is a sectional view showing the first-row tapered rollers 18a and the roller abutment portions 93 in abutment relation. Since the roller abutment portion 93 has the convexed abutment face against the first-row tapered roller 18a, the first-row tapered roller 18a sinks into space between a pair of adjoining roller abutment portions 93. Accordingly, each of the first-row tapered rollers 18a is supported in a stable manner.

The retainer 90 of the third embodiment can be formed more easily than that of the second embodiment. In the retainer 90 of the third embodiment, the main body 91 and the roller abutment portions 93 are radially outwardly convexed. This leads to an advantage that the press forming of the retainer 90 is particularly facilitated.

The material of the retainer 90 may preferably be an elastically deformable one as described above. Specifically, a variety of resins, rubbers, spring steel and the like are usable. It is preferred to use the elastically deformable material for forming the retainer 90, because when the retainer 90 is fitted in the sub-assemble member 20, the roller abutment portions 93 are deformed in conformity with the first-row tapered rollers 18a so as to support the first-row tapered rollers 18a in a stable manner. In this case, as well, the retainer 90 is restored to its original configuration after slid out of the sub-assemble member 20. This favorably allows for the re-use of the retainer 90.

As the cage featuring the high general-purpose versatility, a resin cage is constructed such that a bottom face of the pocket 10 has a greater thickness W2 (see FIG. 14) than a thickness W1 of the annular rib, whereas a metal cage is constructed such that the width W2 of the ridge is equal to the thickness W1 of the annular rib. Accordingly, the cage satisfying such conditions may accomplish the cost reduction more favorably. In a cage featuring even higher general-purpose versatility, a value given by dividing the thickness W2 of the bottom face of the pocket 10 (the thickness of the smaller ring 6b) by the radius R of the smaller bottom of first-row tapered roller 18 is in the range of 0.4 or more and 0.7 or less. Therefore, the cage having the above value in this range features a particularly high general-purpose versatility, accomplishing even further cost reduction. A resin material of the cage featuring the high general-purpose versatility may include glass fiber-reinforced nylon and the like, whereas a metal material of the cage having the high general-purpose versatility may include soft steel sheet and the like.

What is claimed is:

1. An assembling method for a double-row tapered-roller bearing assembly comprising:
    an outer ring including a first outer raceway and a second outer raceway formed on an inner peripheral surface thereof;
    an inner ring including a second inner raceway in opposing relation with the second outer raceway;
    a hub body including a first inner raceway in opposing relation with the first outer raceway, formed with a flange projecting diametrically outwardly from one end thereof, and formed with a smaller-diameter cylindrical surface portion at the other end thereof, the smaller-diameter cylindrical surface portion allowing the inner ring to be fixedly fitted thereon;
    a plurality of first-row tapered rollers interposed between the first inner raceway and the first outer raceway;
    a first cage allowing the first-row tapered rollers to be arranged thereon at regular space intervals; and
    a first seal ring mounted to the outer ring at its end close to the first outer raceway, the method comprising the steps of:
    fabricating a sub-assemble member by combining the first cage with the first-row tapered rollers;
    fitting a retainer ring in the sub-assemble member at place diametrically inwardly with respect to the first-row tapered rollers, thereby pressingly supporting the tapered rollers;
    mounting the sub-assemble member to the first outer raceway of the outer ring;
    mounting the first seal ring to the outer ring with the sub-assemble member mounted thereto at an end of the inner peripheral surface formed with the first outer raceway; and
    combining the hub body with the outer ring having the first seal ring and the sub-assemble member mounted thereto, as pushing out the retainer ring fitted in the sub-assemble member by means of a step portion defined between the smaller-diameter cylindrical surface portion and the first inner raceway of the hub body.

* * * * *